US008369640B2

(12) United States Patent
Ishiga

(10) Patent No.: US 8,369,640 B2
(45) Date of Patent: Feb. 5, 2013

(54) IMAGE PROCESSING FOR REMOVING A NOISE COMPONENT CONTAINED IN AN IMAGE

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 746 days.

(21) Appl. No.: 12/458,855

(22) Filed: Jul. 24, 2009

(65) Prior Publication Data
US 2009/0290067 A1    Nov. 26, 2009

Related U.S. Application Data

(63) Continuation of application No. PCT/JP2008/051652, filed on Feb. 1, 2008.

(30) Foreign Application Priority Data

Feb. 2, 2007 (JP) ................................ 2007-024066
Feb. 2, 2007 (JP) ................................ 2007-024067

(51) Int. Cl.
*G06K 9/00* (2006.01)
(52) U.S. Cl. .................. 382/254; 382/275; 358/3.26
(58) Field of Classification Search .................. 382/254, 382/261
See application file for complete search history.

(56) References Cited

U.S. PATENT DOCUMENTS

| 5,130,820 | A | 7/1992 | Hirota |
| 5,461,655 | A | 10/1995 | Vuylsteke et al. |
| 5,467,404 | A | 11/1995 | Vuylsteke et al. |
| 5,526,446 | A | 6/1996 | Adelson et al. |
| 5,550,936 | A | 8/1996 | Someya et al. |
| 5,920,654 | A | 7/1999 | Someya et al. |
| 6,055,340 | A | 4/2000 | Nagao |
| 6,373,992 | B1 | 4/2002 | Nagao |
| 6,598,973 | B2 * | 7/2003 | Campin ......................... 351/221 |
| 6,628,842 | B1 | 9/2003 | Nagao |
| 6,665,448 | B1 * | 12/2003 | Maurer ......................... 382/261 |
| 6,667,815 | B1 * | 12/2003 | Nagao ............................. 358/1.9 |
| 6,697,537 | B2 * | 2/2004 | Norimatsu .................... 382/275 |
| 6,721,458 | B1 * | 4/2004 | Ancin ........................... 382/261 |
| 6,724,941 | B1 * | 4/2004 | Aoyama ....................... 382/254 |
| 6,724,942 | B1 * | 4/2004 | Arai .............................. 382/254 |
| 6,754,398 | B1 | 6/2004 | Yamada |

(Continued)

FOREIGN PATENT DOCUMENTS

| JP | A-08-274996 | 10/1996 |
| JP | A-2002-074356 | 3/2002 |

(Continued)

OTHER PUBLICATIONS

Lee, "Digital Image Smoothing and the Sigma Filter," *Computer Vision, Graphics, and Image Processing*, 1983, vol. 24, pp. 255-269.

(Continued)

*Primary Examiner* — Hadi Akhavannik
(74) *Attorney, Agent, or Firm* — Oliff & Berridge, PLC

(57) ABSTRACT

An image processing method for removing a noise component contained in an original image, includes: separating an original image into a temporary noise-free image and a temporary noise component; extracting an edge component in the temporary noise-free image by executing edge detection on the temporary noise-free image; determining a fine edge component in the original image contained in the temporary noise component based upon a level of the extracted edge component; extracting an actual noise component by excluding the fine edge component from the temporary noise component; and removing noise from the original image based upon the extracted actual noise component.

11 Claims, 13 Drawing Sheets

U.S. PATENT DOCUMENTS

| | | |
|---|---|---|
| 6,781,625 B2 | 8/2004 | Hayashi |
| 6,937,772 B2 | 8/2005 | Gindele |
| 2008/0089601 A1 | 4/2008 | Ishiga |
| 2008/0095431 A1 | 4/2008 | Ishiga |
| 2008/0123999 A1 | 5/2008 | Ishiga |
| 2008/0199100 A1 | 8/2008 | Ishiga |
| 2009/0040386 A1 | 2/2009 | Ishiga |
| 2009/0046943 A1 | 2/2009 | Ishiga |

FOREIGN PATENT DOCUMENTS

| | | |
|---|---|---|
| JP | A-2006-309749 | 11/2006 |
| WO | WO 2006/064913 A1 | 6/2006 |
| WO | WO 2006/068025 A1 | 6/2006 |
| WO | WO 2006/106919 A1 | 10/2006 |

OTHER PUBLICATIONS

Tomasi et al., "Bilateral Filtering for Gray and Color Images," Proceedings of the 1998 IEEE International Conference on Computer Vision, Bombay, India.

Choudhury et al., "The Trilateral Filter for High Contrast Images and Meshes," Eurographics Symposium on Rendering 2003, pp. 1-11.

* cited by examiner

FIG.8

$$\nabla^2 = \begin{array}{|c|c|c|} \hline -1 & -1 & -1 \\ \hline -1 & 8 & -1 \\ \hline -1 & -1 & -1 \\ \hline \end{array} \Big/ 16$$

ined cation No. PCT/JP2008/051652 filed Feb. 1, 2008.

IMAGE PROCESSING FOR REMOVING A NOISE COMPONENT CONTAINED IN AN IMAGE

This application is a continuation of International Application No. PCT/JP2008/051652 filed Feb. 1, 2008.

INCORPORATION BY REFERENCE

The disclosures of the following priority applications and International Application are herein incorporated by reference: Japanese Patent Application No. 2007-024066 filed Feb. 2, 2007; Japanese Patent Application No. 2007-024067 filed Feb. 2, 2007; and International Application No. PCT/JP2008/051652 filed Feb. 1, 2008.

BACKGROUND OF THE INVENTION

1. Field of the Invention

The present invention relates to an image processing method that may be adopted to remove noise contained in an image.

2. Description of Related Art

The noise removal technologies in the related art include noise removal filters referred to as edge-preserving smoothing filters that assure adaptive smoothing with edge structures retained intact by adaptively comparing the size of edges in image structures with the noise fluctuation width. Such edge-preserving smoothing filters include the σ filter disclosed in non-patent reference 1, the bilateral filter disclosed in non-patent reference 2 assuring a higher level of performance and the modified bilateral filter disclosed in patent reference 1 by the inventor of the present invention.

Noise may also be extracted through a simpler noise extraction method such as that disclosed in patent reference 2, whereby the difference between the original image and a uniformly smoothed image is determined and the edge component and the noise component contained in the difference are separated from each other through nonlinear conversion processing, although this method normally does not assure the level of edge/noise separation accuracy of the edge-preserving smoothing filters described above. In a similar technology disclosed in patent reference 3, the difference between an edge-emphasized image (obtained through local filtering processing executed in the actual space) and a uniformly smoothed image is determined, the noise component and the edge component in the difference are separated through nonlinear conversion and the noise component is corrected by using the edge component as an index. In the latter method, the influence of the noise contained in the edge component is minimized by applying a median filter to the edge component for noise removal.

Patent reference 1: International Publication No. 2006/068025 pamphlet
Patent reference 2: Japanese Laid Open Patent Publication No. 2002-74356
Patent reference 3: U.S. Pat. No. 6,055,340
Nonpatent reference 1: J. S. Lee, "Digital Image Smoothing and the Sigma Filter" Computer Vision, Graphics and Image Processing Vol. 24 pp. 255-269, 1983
Nonpatent reference 2: C. Tomasi et al., "Bilateral Filtering for Gray and Color Images" Proceedings of the 1998 IEEE International Conference on Computer Vision, Bombay, India

SUMMARY OF THE INVENTION

There is still a challenge to be met in that even with an edge-preserving smoothing filter assuring the highest possible level of edge/noise separation accuracy, a very fine edge structure equal to or smaller than the noise fluctuation width cannot be completely distinguished from noise and is, therefore, smoothed, to result in a flat image lacking texture and depth. An image area devoid of textural richness will have lost fine textural details of, for instance, hair, or a loss of texture due to the elimination of very fine edge component in a large edge area will result in loss of three-dimensionality and depth initially achieved by the presence of the superfine edge component.

In the method for correcting the noise component by referencing the edge component adopted in noise removal processing that only assures a relatively low level of edge/noise separation accuracy, the influence of noise within the reference edge is kept down through rudimentary filtering processing. There are, therefore, issues to be addressed in that image quality cannot be improved to a full extent and in that additional noise removal processing executed to assure better image quality may complicate the overall processing.

In addition, while the method in the related art disclosed in patent reference 3 may be fairly effective in handling an edge component mixed in with the noise component, which is obtained through local edge detection and assumes a specific frequency distribution, any edge component deviating from the frequency component distribution cannot be processed in an optimal manner.

For instance, a photographic image of a doll with the textural details of its hair detected as fine local edges substantially matching the noise fluctuation width in the related art will almost completely disappear. In addition, an edge component, the signal intensity of which changes over a range 1~3 times the noise fluctuation width, present in isolation with low density will have a low edge level and thus may not be reproduced successfully. The latter phenomenon may manifest in the loss of, for instance, the black spot pattern within a white lily.

According to the 1st aspect of the present invention, an image processing method for removing a noise component contained in an original image, comprises: separating an original image into a temporary noise-free image and a temporary noise component; extracting an edge component in the temporary noise-free image by executing edge detection on the temporary noise-free image; determining a fine edge component in the original image contained in the temporary noise component based upon a level of the extracted edge component; extracting an actual noise component by excluding the fine edge component from the temporary noise component; and removing noise from the original image based upon the extracted actual noise component.

According to the 2nd aspect of the present invention, in the image processing method according to the 1st aspect, it is preferred that a probability of the fine edge component being present in the temporary noise component is estimated to be higher when the level of the edge component is greater relative to a noise fluctuation index value determined uniquely in correspondence to the original image.

According to the 3rd aspect of the present invention, in the image processing method according to the 2nd aspect, it is preferred that a mixing ratio with which the fine edge component is present is statistically estimated based upon a Gaussian distribution probability assuming a ratio of the edge component and the noise fluctuation index value as an argument.

According to the 4th aspect of the present invention, in the image processing method according to the 3rd aspect, it is preferred that the fine edge component is excluded through attenuation by multiplying the temporary noise component by the Gaussian distribution probability.

According to the 5th aspect of the present invention, in the image processing method according to the 1st aspect, it is preferred that the original image is separated into the temporary noise-free image having undergone adaptive smoothing and the temporary noise component representing a residue thereof by setting a noise fluctuation index value determined uniquely in correspondence to the original image and comparing a signal fluctuation width detected in an original image structure with the noise fluctuation index value.

According to the 6th aspect of the present invention, in the image processing method according to the 5th aspect, it is preferred that: the temporary noise-free image having undergone adaptive smoothing is generated through weighted averaging of signal values at pixels near a target pixel, which fluctuate over a narrow range equal to or less than a range indicated by the noise fluctuation value, the weighted averaging being selectively executed according to a signal differential value; and the temporary noise component is obtained by determining a difference between the temporary noise-free image and the original image.

According to the 7th aspect of the present invention, in the image processing method according to the 5th aspect, it is preferred that the temporary noise component is extracted through a signal conversion processing phase in which only a component fluctuating over a small range equal to or less than a range indicated by the noise fluctuation index value in a differential signal representing a difference between the original image and a uniformly smooth image, is allowed to pass through; and the temporary noise-free image is generated by subtracting the temporary noise component from the original image.

According to the 8th aspect of the present invention, in the image processing method according to the 1st aspect, it is preferred that an image referencing range over which the edge detection is executed is set in correspondence to an image referencing range set for generation of the temporary noise-free image.

According to the 9th aspect of the present invention, in the image processing method according to the 1st aspect, it is preferred that the original image is a band-limited subband image in multiresolution representation.

According to the 10th aspect of the present invention, in the image processing method according to the 1st aspect, it is preferred that the original image is an original image expressed in an actual space.

According to the 11th aspect of the present invention, in the image processing method according to the 1st aspect, it is preferred that processing on the original image is executed individually on a luminance plane and a chrominance plane.

According to the 12th aspect of the present invention, an image processing method for removing a noise component contained in an original image, comprises: generating a plurality of band-limited images assuming sequentially lower resolution levels by filtering an original image; separating each band-limited image to a temporary noise-free image and a temporary noise component; extracting an edge component in the temporary noise-free image in correspondence to each band-limited image through edge detection executed on the temporary noise-free image; synthesizing temporary noise component signals in the band-limited images having been separated, so as to generate a synthesized temporary noise component assuming a resolution level matching a resolution level of the original image; synthesizing edge component signals in the band-limited images having been extracted, so as to generate a synthesized edge component assuming the resolution level matching the resolution level of the original image; determining, based upon the synthesized edge component, a quantity of an edge component in the original image contained in the synthesized temporary noise component; extracting an actual noise component by excluding the edge component in the original image from the synthesized temporary noise component; and removing noise from the original image based upon the extracted actual noise component.

According to the 13th aspect of the present invention, in the image processing method according to the 12th aspect, it is preferred that a probability of the edge component having been mixed in during temporary noise removal is estimated to be higher when a level of the synthesized edge component is greater relative to a noise fluctuation index value determined uniquely in correspondence to the original image.

According to the 14th aspect of the present invention, in the image processing method according to the 13th aspect, it is preferred that a mixing ratio with which the edge component has been mixed in during the temporary noise removal is statistically estimated based upon a Gaussian distribution probability assuming a ratio of the synthesized edge component and the noise fluctuation index value as an argument.

According to the 15th aspect of the present invention, in the image processing method according to the 14th aspect, it is preferred that the edge component having been mixed in during the temporary noise removal is excluded through attenuation by multiplying the synthesized temporary noise component by the Gaussian distribution probability.

According to the 16th aspect of the present invention, in the image processing method according to the 12th aspect, it is preferred that the temporary noise removal and synthesis of the temporary noise component are both executed by using band-limited images that correspond to low-frequency images and high-frequency images respectively.

According to the 17th aspect of the present invention, in the image processing method according to the 12th aspect, it is preferred that extraction of the edge component and synthesis of the extracted edge component are both executed by using band-limited images that correspond to only high-frequency images.

According to the 18th aspect of the present invention, in the image processing method according to the 2nd aspect, it is preferred that a uniform index value is used as the noise fluctuation index value irrespective of a brightness level of the original image by converting the original image to an image in uniform noise space or an image in a uniform color•uniform noise space.

According to the 19th aspect of the present invention, an image processing method for removing a noise component contained in an original image, comprises: extracting a noise component contained in an original image; generating a plurality of band-limited images assuming sequentially lower resolution levels by filtering the original image; extracting an edge component in each of the band-limited images by executing edge detection on the band-limited image; synthesizing edge component signals extracted from the band-limited images to generate an synthesized edge component assuming a resolution level matching a resolution level of the original image; and removing noise from the original image based upon the extracted noise component and the synthesized edge component.

According to the 20th aspect of the present invention, in the image processing method according to the 19th aspect, it is preferred that: a quantity of an edge component present in the extracted noise component is estimated based upon a level of the synthesized edge component; the edge component present in the extracted noise component is excluded from the extracted noise component based upon estimation results; and noise is removed from the original image based upon the noise component from which the edge component has been excluded.

According to the 21st aspect of the present invention, in the image processing method according to the 19th aspect, it is preferred that: a noise component is extracted from each of the band-limited images; and noise component signals extracted from the band-limited images are synthesized to generate an synthesized noise component assuming a resolution level matching the resolution level of the original image and the noise component contained in the original image is extracted.

According to the 22nd aspect of the present invention, in the image processing method according to the 19th aspect, it is preferred that: a temporary noise-free image is generated in correspondence to each of the band-limited images prior to edge component extraction; a residual edge component remaining following temporary noise removal is extracted in correspondence to each band-limited image by executing the edge detection on the band-limited image having undergone the temporary noise removal; and residual edge component signals having been extracted from the band-limited images are synthesized as the edge component so as to generate an synthesized edge component assuming a resolution level matching the resolution of the original image.

According to the 23rd aspect of the present invention, a computer-readable computer program product contains an image processing program enabling a computer or an image processing apparatus to execute an image processing method according to the 1st aspect.

According to the 24th aspect of the present invention, an image processing apparatus comprises a control device that executes an image processing method according to the 1st aspect.

According to the 25th aspect of the present invention, an electronic camera comprises a control device that executes an image processing method according to the 1st aspect.

BRIEF DESCRIPTION OF THE DRAWINGS

FIG. 8 shows a 3×3 Laplacian filter.

DESCRIPTION OF PREFERRED EMBODIMENTS

First Embodiment

Figure 1:
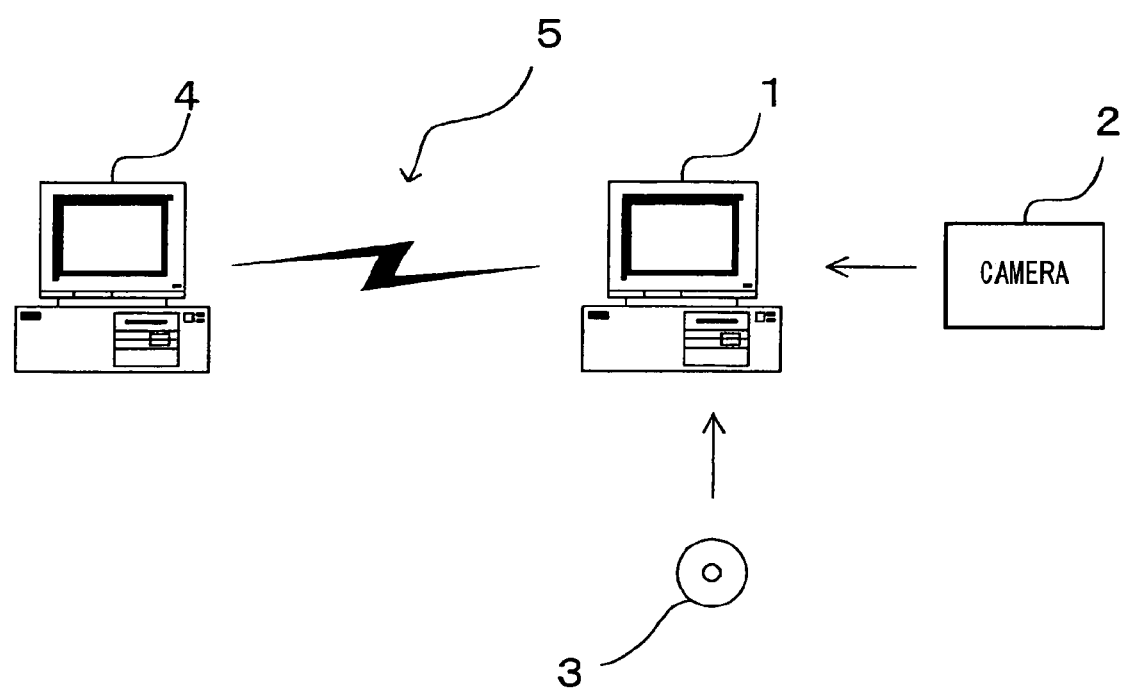
FIG. 1 shows an image processing apparatus achieved in an embodiment of the present invention.

FIG. 1 shows the image processing apparatus achieved in an embodiment of the present invention. The image processing apparatus is constituted with a personal computer 1. The personal computer 1, which is connected with a digital camera 2, a recording medium 3 such as a CD-ROM, another computer 4 and the like, is able to receive various types of image data. The personal computer 1 executes the image processing to be explained below on the image data provided thereto. The personal computer 1 is connected to the computer 4 via an electronic communication network 5, which may be the Internet.

Figure 10:
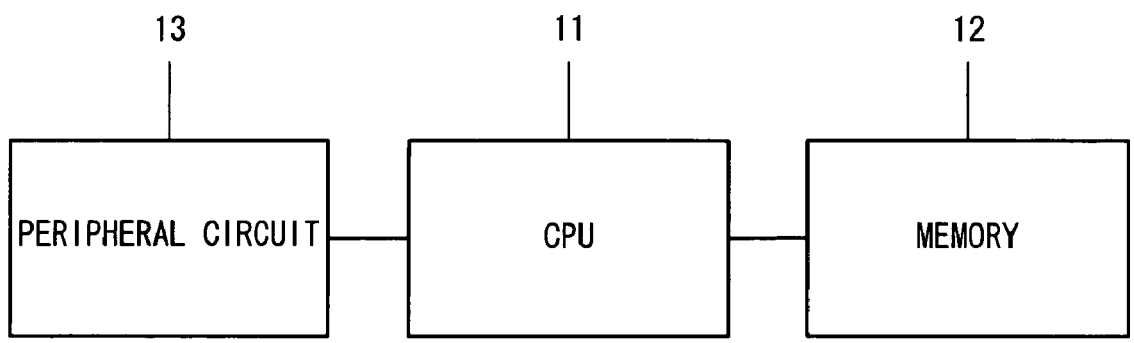
FIG. 10 shows the structure of the personal computer.

The program that enables the computer 1 to execute the image processing is provided in a recording medium such as a CD-ROM or by another computer via the Internet or another electronic communication network connected to the personal computer in a manner similar to that shown in FIG. 1, and the program thus provided is installed within the personal computer 1. FIG. 10 shows the structure of the personal computer 1. The personal computer 1 comprises a CPU 11, a memory 12, peripheral circuits 13 and the like. The installed program is executed by the CPU 11.

The program to be provided via the Internet or another electronic communication network is converted to and transmitted as a signal on a carrier wave which is carried through the electronic communication network, i.e., a transmission medium. Namely, the program can be distributed as a computer-readable computer program product adopting any of various modes including a recording medium and a carrier wave.

Figure 2:
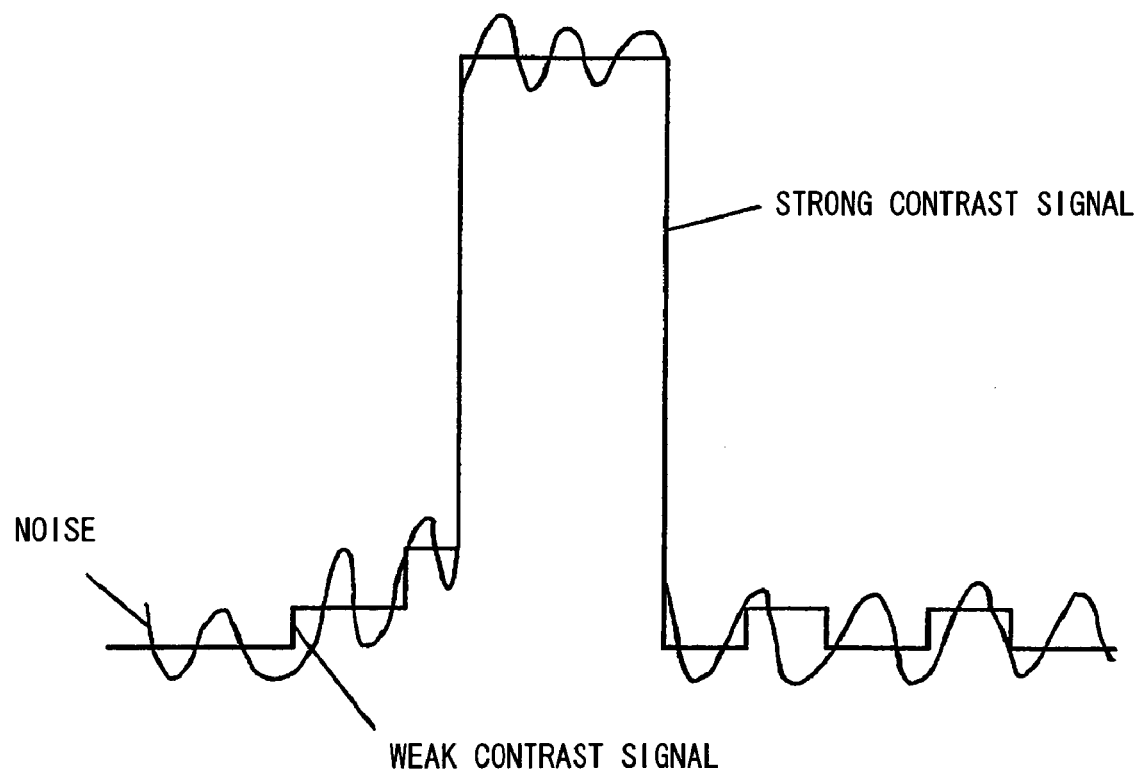
FIG. 2 is a diagram showing the relationship of noise to strong contrast signals and weak contrast signals among image signals.

FIG. 2 shows the relationship of noise to strong contrast signals and weak contrast signals among the image signals. As shown in FIG. 2, weak contrast signals (expressing fine edge structures) are buried in noise and thus, it is impossible to distinguish the weak contrast signals from the noise no matter how high the edge/noise separation accuracy level of the edge-preserving smoothing filter in use may be.

This means that as the noise is removed the weak contrast signals are also removed, resulting in the loss of textural richness in the image. The image processing apparatus achieved in the embodiment addresses this challenge. Namely, it adaptively distinguishes noise and a weak contrast signal with a signal level equal to or less than the noise fluctuation width from each other in an optimal manner so as to remove the noise by accurately excluding the weak contrast signal from the noise component.

Figure 3:
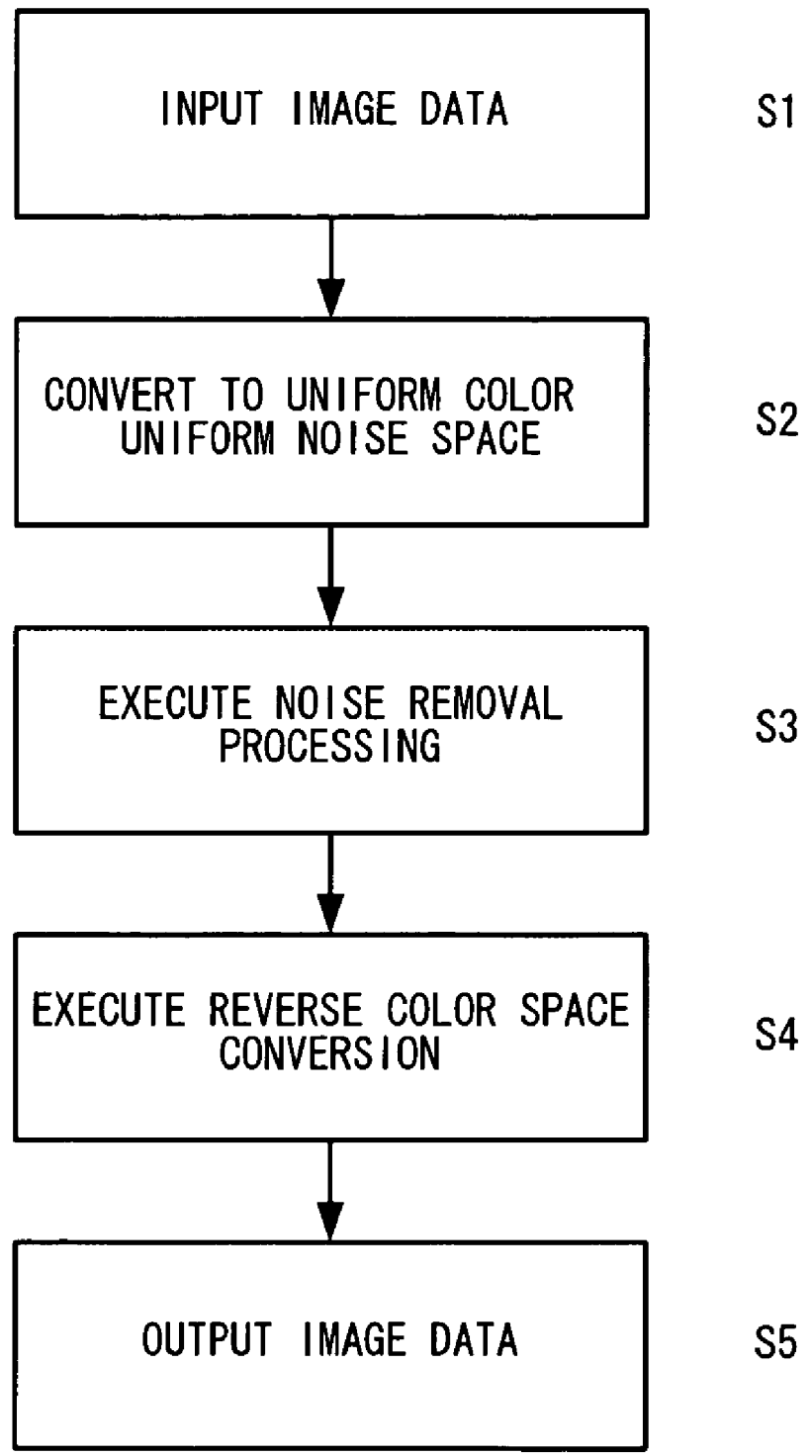
FIG. 3 presents a flowchart of the image processing executed by the personal computer 1 in a first embodiment.

The following is a description of the image processing executed in the personal computer 1. FIG. 3 presents a flowchart of the image processing executed by the personal computer 1 in the first embodiment. In step S1, image data are input. In step S2, the image data are converted to data in a uniform color•uniform noise space. In step S3, noise removal processing is executed. In step S4, color space reverse conversion is executed. In step S5, the image data resulting from the processing are output. The processing executed in the individual steps is now described in detail.

1. Color Space Conversion

After the image data (hereafter referred to as an image) are input in step S1, the input image undergoes color space conversion and thus is projected into an image processing space optimal for the noise removal processing in step S2. Such an image processing space may be, for instance, the uniform color•uniform noise space disclosed in International Publication No. 2006/064913 pamphlet (proposed by the inventor of the present invention). The input image is usually expressed in a standard color space such as the sRGB color space. Accordingly, the following explanation is provided by assuming that the input image is an sRGB image having undergone color correction processing, gamma correction processing and the like.

1-1 Reverse Gamma Correction

The gradation conversion, having been executed to achieve gamma characteristics conforming to the sRGB specifications or the unique gamma characteristics assumed by the camera manufacturer in conjunction with its proprietary image creation technology, is undone so as to convert the data back to the initial linear gradation data. The sRGB image is converted back to the initial linear gradation data through reverse gamma correction as expressed below. If the manufacturer-inherent gamma characteristics cannot be ascertained, reverse conversion for gamma characteristics conforming to the sRGB specifications may substitute for $\gamma^{-1}$.

$$R_{sRGB}^{linear} = \gamma^{-1}(R_{sRGB})$$

$$G_{sRGB}^{linear} = \gamma^{-1}(G_{sRGB})$$

$$B_{sRGB}^{linear} = \gamma^{-1}(B_{sRGB}) \qquad \text{[Expression 1]}$$

1-2 Conversion from RGB Color Space to XYZ Color Space

Next, the RGB color space data having been converted back to the linear gradation data are converted to data in the XYZ color space. This conversion is executed through a specific 3×3 matrix conversion, which is determined in correspondence to the spectral characteristics of the RGB reference color stimuli. For instance, the sRGB input image having been converted back to linear gradation data may undergo the following standard conversion.

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{sRGB}^{linear} \\ G_{sRGB}^{linear} \\ B_{sRGB}^{linear} \end{pmatrix} \qquad \text{[Expression 2]}$$

1-3 Conversion from XYZ Color Space to Uniform Color•Uniform Noise Color Space (L̂âb̂)

Next, the data in the XYZ space are converted to a nonlinear gradation L̂âb̂ space representing a perceptive attribute with a pseudo-uniform color distribution. The L̂âb̂ space is defined in the description of the embodiment as a space obtained by modifying the uniform color space L*a*b* in the related art in consideration of uniform noise and, for the sake of convenience, is referred to as L̂âb̂.

$$\hat{L} = 100 \cdot f\left(\frac{Y}{Y_0}\right) \qquad \text{[Expression 3]}$$

$$\hat{a} = 500\left\{f\left(\frac{X}{X_0}\right) - f\left(\frac{Y}{Y_0}\right)\right\}$$

$$\hat{b} = 200\left\{f\left(\frac{Y}{Y_0}\right) - f\left(\frac{Z}{Z_0}\right)\right\}$$

The gradation characteristics used to achieve uniform color•uniform noise in this process are usually expressed as;

$$f(t) = \frac{\sqrt{t+\varepsilon} - \sqrt{\varepsilon}}{\sqrt{1+\varepsilon} - \sqrt{\varepsilon}} \qquad \text{[Expression 4]}$$

However, the expression above may be modified as expressed below by applying a positive offset value to the ⅓ power gamma characteristics of the CIE-compliant L*a*b* space, so as to achieve gradation characteristics with uniform noise.

$$f(t) = \frac{\sqrt[3]{t+\varepsilon} - \sqrt[3]{\varepsilon}}{\sqrt[3]{1+\varepsilon} - \sqrt[3]{\varepsilon}} \qquad \text{[Expression 5]}$$

X0, Y0 and Z0 in the expressions above each represent a value determined in correspondence to the illuminating light. For instance, X0, Y0 and Z0 may assume values 95.045, 100.00 and 108.892 respectively in a 2° visual field under standard light D65. While $\varepsilon$ assumes a value dependant upon the specific sensor in use, a value very close to zero, for instance, will be assumed when a low sensitivity setting is selected and a value approximately equal to 0.05 will be assumed when a high sensitivity setting is selected.

2 Multiresolution Image Representation

Next, the noise removal processing executed in step S3 is explained. FIG. 3 presents a flowchart of the noise removal processing executed based upon multiresolution image representations in the embodiment. Namely, the original images corresponding to the luminance component L̂, the chrominance (color difference) components â and b̂ resulting from the data conversion to the uniform color•uniform noise color space described above are rendered in multiple resolution levels and then they individually undergo noise removal independently of one another. The analysis phase of sequential wavelet transformation, through which subband images are generated by decomposing each original image into lower resolution images, is summarized in the expression below.

$$V_{ij}(\vec{x}) = \text{Wavelet}_{(i,j)}\{S(\vec{x})\} \qquad \text{[Expression 6]}$$

i=1, 2, . . . , 5 (resolution)

j=LL, LH, HL, HH

It is to be noted that a subband image Vij(x, y) is generated with S(x, y) in correspondence to each of the L̂âb̂ planes.

It is also to be noted that in the wavelet transformation, through which an image (image data) is converted to frequency component data, the frequency component in the image is divided into a high-pass component and a low-pass component. Data made up of the high-pass component referred to as a high-frequency subband, whereas data made up of the low-pass component are referred to as a low-frequency subband. The LL component data are low-frequency subband data, whereas the LH, HL and HH data are high-frequency subband data. Also, a low-frequency subband may be referred to as a low-frequency image and a high-frequency subband may be referred to as a high-frequency image. Furthermore, each subband may be referred to as a frequency band-limited image. A low-frequency subband is an image with band limits imposed upon the frequency band of the original image toward the low-frequency side, whereas a high-frequency subband is an image with band limits imposed upon the frequency band of the original image toward the high-frequency side.

While only the high-frequency subbands, obtained by sequentially decomposing the low-frequency subband LL component, are simply retained in the standard multiresolution transformation, the embodiment adopts multiple resolution levels whereby both the low-frequency subband LL and the high-frequency subbands LH, HL and HH are retained, so as to ensure that the noise component is always extracted from one subband frequency range to another.

The wavelet transformation may be executed by using, for instance, the 5/3 filter described below.

(Wavelet Transformation: Analysis/Decomposition Process)

high-pass component: $d[n]=x[2n+1]-(x[2n+2]+x[2n])/2$ low-pass component: $s[n]=x[2n]+(d[n]+d[n-1])/4$ The one-dimensional wavelet transformation defined as described above is executed along the horizontal direction and the vertical direction independently through two-dimensional separation filtering processing so as to achieve wavelet decomposition. The coefficient s is directed onto the L plane, whereas the coefficient d is directed onto the H plane.

(Inverse Wavelet Transformation: Synthesis/Reconstruction Process)

$x[2n]=s[n]-(d[n]+d[n-1])/4$ $x[2n+1]=d[n]+(x[2n+2]+x[2n])/2$

Figure 4A:
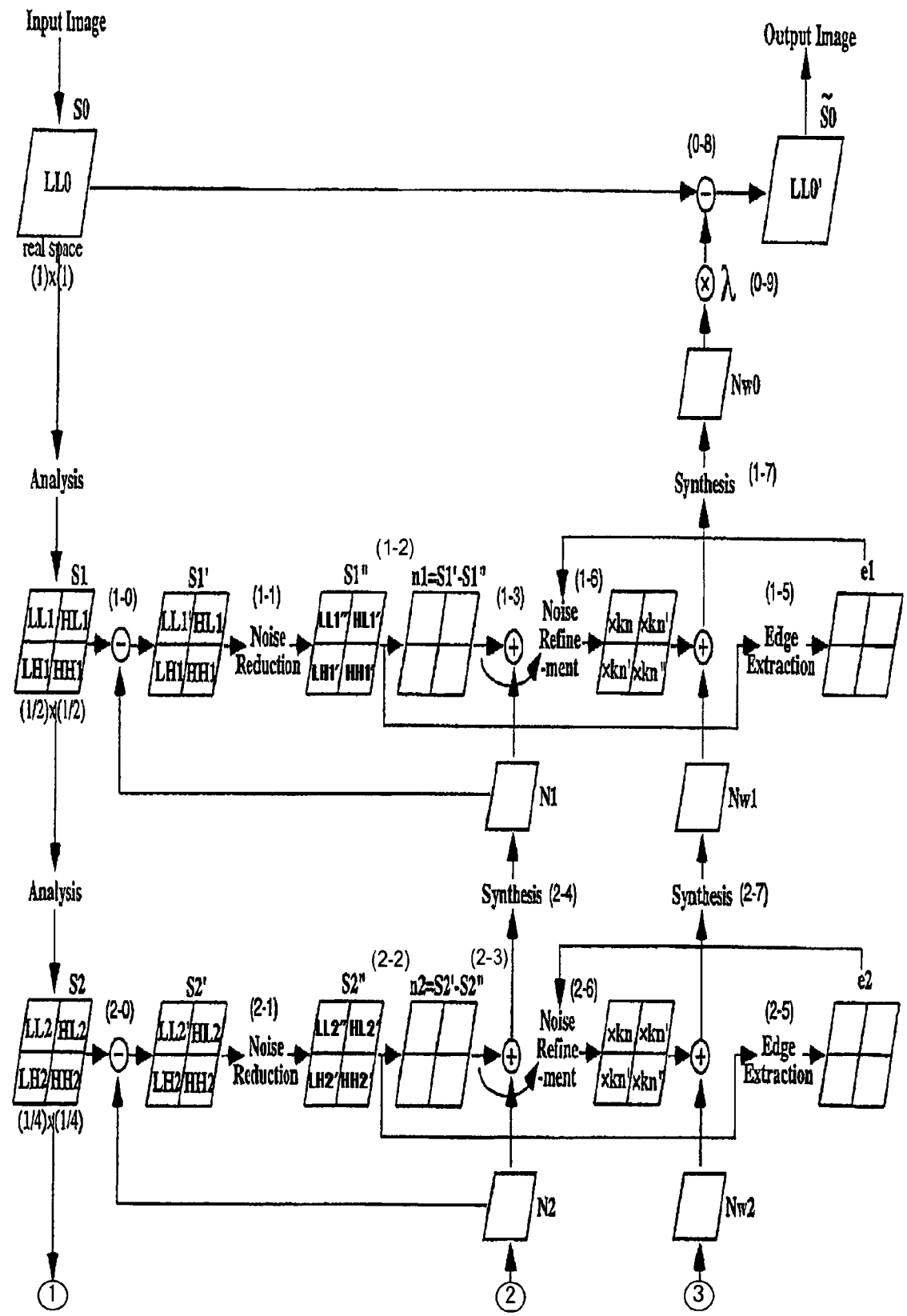
FIGS. 4A-4B present a flowchart of the noise removal processing executed based upon multiple resolution levels in the first embodiment.
Figure 4B:
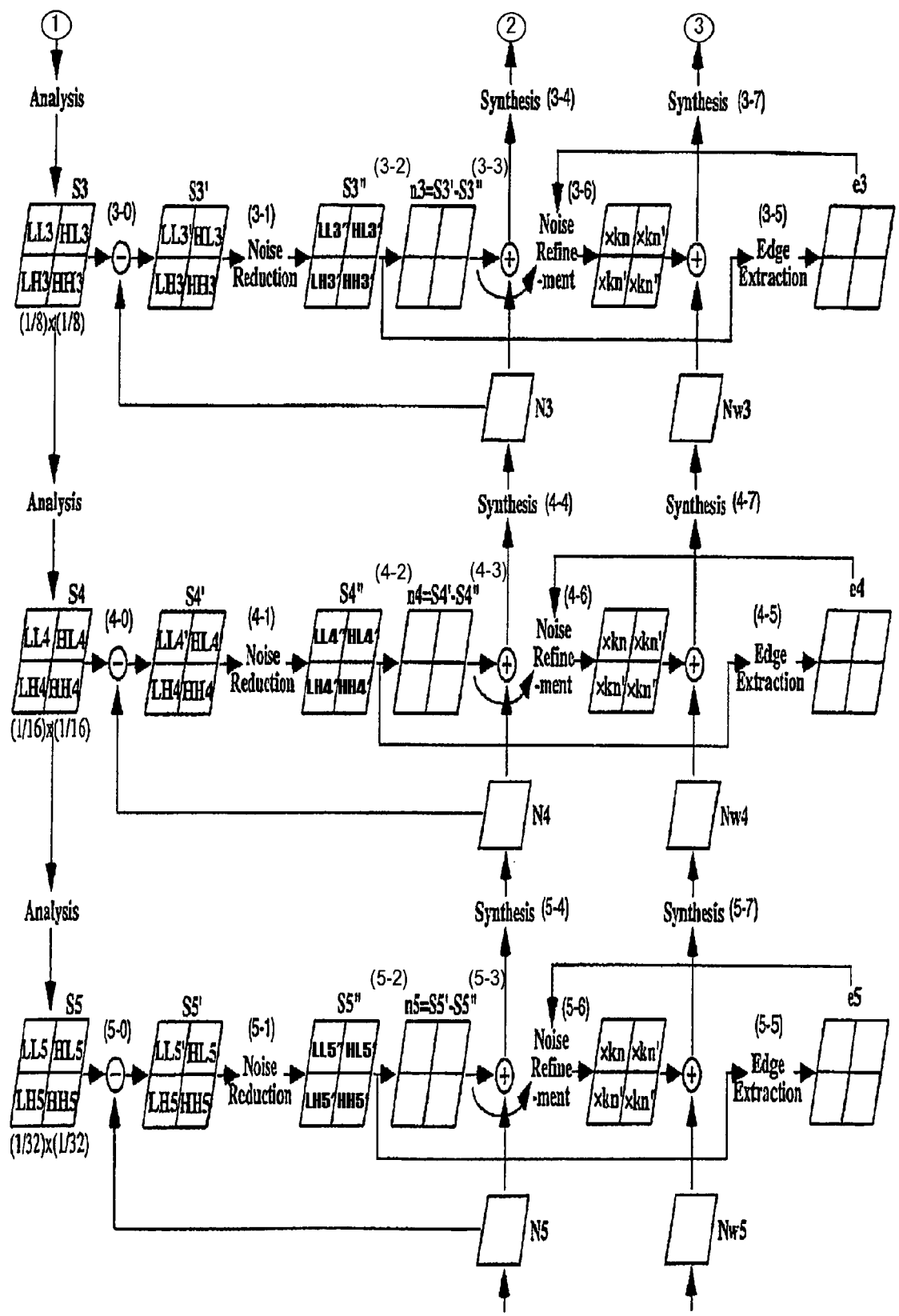

It is to be noted that a signal expressing the image is input to be used as the x value in the wavelet transformation, that the noise component contained in the wavelet transformation coefficients s and d having been generated is extracted and that the values of the extracted noise component are set as s and d for substitution in the inverse wavelet transformation so as to generate a noise image x, as shown in FIGS. 4A-4B.

While the multiple resolution levels are achieved through the five-stage wavelet transformation in the example described above, the number of stages over which the wavelet transformation is executed may be adjusted in correspondence to the size of the initial input image. In addition, instead of the (bilateral) orthogonal wavelet transformation described above, Laplacian pyramid representation, steerable pyramid representation or the like may be adopted to achieve the multiple resolution levels.

3 Noise Extraction Processing Through Virtual Noise Removal 3-1 Noise Extraction Processing with Noise Removal Filter 3-1-1 Noise Removal Processing First, virtual noise removal is executed at each resolution. The term "virtual noise removal" refers to the noise removal executed on a temporary basis prior to the ultimate noise removal executed to remove noise from the original image. While the virtual noise removal may be executed on the individual subbands at each resolution by using any noise removal filter, the following explanation focuses on a modified bilateral filter such as that expressed below, disclosed in International Publication No. 2006/06825 pamphlet (disclosed by the inventor of the present invention) and achieved by modifying a high-performance bilateral filter. Since the image signal V(x, y) has shifted into a space that assures uniform noise relative to the brightness through the nonlinear gradation conversion executed in step S2 in FIG. 2, the filter simply must be set so as to compare the signal with a noise index value unaffected by the luminance level. Under such circumstances, the noise removal filter provides a highest level of performance through simple operation.

$$V'(\vec{x}) = \frac{\int_{|\vec{x}'-\vec{x}| \leq 2r_{th}} V(\vec{x}') \exp\left(-\frac{|V(\vec{x}')-V(\vec{x})|^2}{\sigma_{th}^2} \cdot \frac{|\vec{x}'-\vec{x}|^2}{r_{th}^2}\right) d\vec{x}'}{\int_{|\vec{x}'-\vec{x}| \leq 2r_{th}} \exp\left(-\frac{|V(\vec{x}')-V(\vec{x})|^2}{\sigma_{th}^2} \cdot \frac{|\vec{x}'-\vec{x}|^2}{r_{th}^2}\right) d\vec{x}'}$$ [Expression 7]

For purposes of simplification, the expression above does not include the subband identifying symbols i and j. The threshold value $\sigma_{th}$ is set in correspondence to the expected noise fluctuation width (noise fluctuation index value) in each subband and the noise component is extracted by distinguishing noise from edges. However, an edge signal with a signal level lower than $\sigma_{th}$ may be designated as a smoothing target. $\sigma_{th}$ is set so as to assume a greater value as the ISO sensitivity rises. For instance, $\sigma_{th}$ may be set to a value of approximately 10 in correspondence to 256 gradation levels at ISO 6400. Accordingly, noise fluctuation occurs to an extent of approximately ±10 over the full gradation range of data achieving uniform noise and S/N=256/10 even at the lightest saturation level. This means that as the required level of noise removal intensity increases at a high ISO sensitivity level, it becomes more difficult to accurately separate a weak edge component from noise through the noise removal filter.

The threshold value rth should assume a value in a range of, for instance, 0.5~3.0 pixels so as to ensure that the ranges of the noise removal filters at different resolution levels overlap. In addition, the integrating range should be set so that the range is equivalent to double or triple the rth value in order to ensure that the coefficient assumes a small enough value. A satisfactory level of noise removal effect can be normally achieved with another type of noise removal filter, as long as it executes filtering processing on subband images expressed through multiple resolution levels by referencing pixel signals within a pixel range of 3×3~9×9.

It is to be noted that the modified bilateral filter is a non-separation weighting-type bilateral filter, which differs from the standard bilateral filter in that the weighting coefficient cannot be separated into a photometric term and a geometric term. This means that the modified bilateral filter assumes a weighting coefficient represented by a single exponential function with a value represented by the product of two arguments set as an exponent thereof.

3-1-2 Noise Extraction Processing

Noise extraction processing is executed for each subband as expressed below.

$n_{ij}(\vec{x}) = V_{ij}(\vec{x}) - V_{ij}'(\vec{x})$ [Expression 8]

As explained earlier, this extracted noise component is likely to contain an edge component with low contrast, having been mixed therein during the smoothing process.

3-2 Sequential Noise Extraction

It is difficult to extract the entire noise component seamlessly through noise removal filtering executed on each subband plane. Accordingly, noise is extracted sequentially by referencing the noise having been extracted at another resolution level so as to ensure that there will be no gap between the frequency bands separated by multiresolution decomposition in the embodiment.

While the sequential noise removal may be executed either during the analysis phase or during the synthesis phase, the noise removal filtering operation mentioned earlier is executed in the first embodiment upon facilitating the extraction of the noise component from the LL plane by executing virtual noise synthesis for purposes of complete noise component extraction and subtracting the synthesized noise component generated at each hierarchical layer from the corresponding LL subband plane. In other words, sequential noise removal is executed during the synthesis phase in the embodiment.

An explanation is now given on the processing executed on image signals S2 (LL2, LH2, HL2, HH2) at ¼ resolution level, generated by executing wavelet transformation on an image signal S0 (LL0) on the actual space plane twice. First, the synthesized noise component (N2) having been generated through noise synthesis executed for the ⅛ resolution hierarchical layer, i.e., the hierarchical layer immediately below the ¼ resolution hierarchical layer, is subtracted from the subband LL2, thereby creating LL2' in which the noise component can be extracted with ease from LL2 (processing (2-0)). Subsequently, the noise removal filtering operation explained earlier is executed on each subband (LL2', HL2, LB2, HH2) (processing (2-1)).

Subsequently, a noise component n2 is extracted (processing (2-2)) by subtracting the image signals S2" (subbands LL2", HL2', LH2', HH2') having undergone the noise removal filtering operation from the image signals S2' (subbands LL2', HL2, LH2, HH2) in the pre-noise removal filtering operation state. The noise component at the LL plane in the extracted noise component n2 is added to the noise component (N2) generated through noise synthesis at the lower hierarchical layer (processing (2-3)), then noise synthesis is executed through inverse wavelet transformation by using the added LL plane noise component and the extracted noise component signals corresponding to the other planes, i.e., the LH, HL and HH planes, thereby generating a synthesized noise component (N1) (processing (2-4)). The processing described above is executed at the individual hierarchical layers to achieve a virtual noise synthesis. Namely, the virtual noise synthesis is expressed as follows.

$$N(\vec{x}) = \sum_{\substack{i=LL,LH,HL,HH \\ j=1,2,\ldots,5}} Wavelet^{-1}\{n_{ij}(\vec{x})\}$$ [Expression 9]

While FIGS. 4A-4B clearly indicates the processing details, the processing in FIGS. 4A-4B is equivalent to repeatedly executing processing whereby arithmetic processing expressed as $$N_M(\vec{x}) = \sum_{\substack{i=LL,LH,HL,HH \\ j=5,4,\ldots,M+1}} Wavelet^{-1}\{n_{ij}(\vec{x})\}$$ [Expression 10]

$$V_{LL,j}'(\vec{x}) = V_{LL,j}(\vec{x}) - N_j(\vec{x})$$ [Expression 11]

is followed by the processing explained in 3-1-1 and 3-1-2. When M=5, the noise component synthesis is executed with noise actually not extracted and thus, N5 (x, y)=0.

4 Noise Refining Through Residual Edge Observation

As explained earlier, even a noise component having been extracted through highly accurate noise removal is bound to contain a low contrast edge component. Accordingly, the potential advantage of noise refining processing executed to improve the purity of the noise component by eliminating the low contrast edge component contained in the noise component having been extracted on a temporary basis through the noise removal filter, is deliberated in reference to the embodiment. The basic concept of the noise refining processing is as follows; based upon an assumption that the likelihood of a low contrast edge being present over an area where a high contrast edge is also present is high, the edge component contained in the noise is statistically separated from the noise.

While a high contrast edge is extracted in the related art by independently extracting the high contrast edge from the original image or by separately extracting the noise and the edge from the original image, and then applying a uniform filter so as to minimize the influence of any noise contained in the edge, the influence of noise is reliably minimized in the embodiment by using the processing results provided via the noise removal filter, which plays a central role in the noise removal. Namely, since the adverse effect of noise is accurately eliminated as a result of the noise removal filtering processing without having to control the noise influence independently through a special system, it is possible to detect a high contrast residual edge completely free from the influence of noise through edge extraction achieved through edge detection processing executed on the plane having undergone the temporary noise removal, although a low contrast edge is likely to become lost.

Noise refining executed based upon the intensity of the edge free of the influence of the noise under the statistical assumption described earlier assures a high level of accuracy in the noise refining and thus further improves the edge/noise separation accuracy. Namely, since the noise removal processing needs to be executed only once, the overall processing is further simplified and a high level of reliability is assured with regard to the residual edge component used as the index in the noise refining.

It is to be noted that the term "high contrast edge" is used to refer to an edge assuming contrast, the level of which is equal to or higher than the level at which noise can be successfully separated from an edge through the noise removal filter, whereas the term "low contrast edge" is used to refer to an edge assuming a contrast level at which successful noise/edge separation cannot be achieved.

4-1 Edge Extraction

The following explanation focuses on the processing executed at the hierarchical layer corresponding to the ¼ resolution level as an example. An edge component e2 is extracted (processing (2-5)) as expressed below from each of the subband planes (LL2", HL2', LH2', HH2') having undergone the virtual noise removal (temporary noise removal). It is to be noted that the following expression is a standard expression applicable to each subband.

$$e_{ij}(\vec{x}) = \nabla^2 V_{ij}'(\vec{x})$$ [Expression 12]

The edge detection filter used in this process is a Laplacian filter. While the simplest Laplacian filter assuming a coefficient of 8 at the center and a coefficient of −1 at the periphery, defined in conjunction with a standard 3×3 filter, may be utilized, it is desirable to interlock the filtering range of the Laplacian filter with the filtering range of the noise removal filter so as to extract the residual edge remaining after the virtual noise removal with a high level of accuracy. In other words, the image referencing range over which the image is to be referenced for purposes of edge detection should be set in correspondence to the size of the image referencing range over which the image is referenced in order to generate the virtual noise-free image.

For instance, in conjunction with a noise removal filter with the smoothing target range set at approximately 9×9, the filtering range of the Laplacian filter, too, should beset to the matching range of approximately 9×9. The Laplacian filter, modeled on an original image-Gaussian smoothed image definition, may be expressed as follows. In the following expression, t represents a transposed matrix constituted with the product of one-dimensional separation filters.

$$\nabla^2 = 1 - (\text{Gaussian})_{9\times 9} \quad [\text{Expression 13}]$$
$$= 1 - {}^t(1\ 8\ 28\ 56\ 70\ 56\ 28\ 8\ 1)/256 \otimes$$
$$(1\ 8\ 28\ 56\ 70\ 56\ 28\ 8\ 1)/256$$

4-2 Noise Refining with Single-Layer Edge

The noise component n2 having been extracted from each subband plane is then refined within the corresponding layer plane, i.e., within a single-layer plane by using the residual edge component e2 having been extracted from the same subband plane. Based upon a hypothesis that when a residual edge component indicates a value greater than an expected noise value, the presence of an edge component with lower contrast over the residual edge structure is bound to be more pronounced, most of the extracted noise component is estimated to be attributable to the low contrast edge component rather than the noise component. Namely, the likelihood of the low contrast edge component being present in the extracted noise component is estimated to be high. Then, the edge component is statistically excluded (processing (2-6)) by multiplying the noise component by a Gaussian probability distribution attenuating factor, as expressed below. It is to be noted that the following expression is a standard expression applicable to each subband.

$$n'_{ij}(\vec{x}) = n_{ij}(\vec{x}) \cdot \exp\left(-\frac{e_{ij}(\vec{x})^2}{\sigma_{ethij}^2}\right) \quad [\text{Expression 14}]$$

The expression provided above indicates that the mixing ratio indicating the ratio of the low contrast edge component (fine edge component) present in the noise component is statistically estimated based upon the Gaussian distribution probability assuming the ratio of the residual edge component and the expected noise value as an argument. A value 3~5 times the expected noise value $\sigma_{thij}$ (the value used in expression 7) corresponding to each subband plane should be selected for $\sigma_{ethij}$. As the expected noise value $\sigma_{thij}$ is provided as a standard deviation of the noise fluctuation quantity and is represented by the noise level value 1σ, the mixing ratio of fine edge component is estimated to be high whenever a significant residual edge equivalent to 3σ or 5σ relative to noise assuming a normal distribution, which cannot be statistically assumed to be noise, is detected. Namely, while the noise fluctuation width should be less than the ±1σ range with a 68.3% probability relative to the value indicated in the error function and deviate from the range with the remaining probability, the chance of noise fluctuation width deviation is reduced to a 0.3% probability by widening the range to ±3σ. The chance of deviation is completely eliminated by widening the range to ±5σ. This means that any edge component detected to indicate a greater level difference can be judged to be an edge constituting part of an image structure with a high level of reliability and that a weak edge, readily buried in a noise signal, is likely to be contained in the noise component present nearby this strong edge structure.

It is to be noted that the expected noise value $\sigma_{th}$, also referred to as a noise fluctuation index value, is a fixed value determined in correspondence to the ISO sensitivity or in correspondence to the sensor being used. It is a value uniquely determined for the obtained image. The expected noise value $\sigma_{thij}$ corresponding to each subband, too, is a value uniquely determined based upon the $\sigma_{th}$ value and the multiresolution transformation defining expression. The value for $\sigma_{th}$ can be ascertained in correspondence to each luminance level in a linear gradation space by photographing a completely white image in advance. The right-side exponential term exp( ) in the expression provided above takes a smaller value as the value of the edge component e becomes larger relative to the expected noise value $\sigma_{th}$, and the noise component n', devoid of the edge component, is extracted by attenuating the noise component e.

The processing described above is executed in correspondence to each hierarchical layer.

As a result, the low contrast edge component, which cannot be separated through the noise removal filter, can be excluded from the noise component. Thus, the challenge of the related art, i.e., the removal of the low contrast edge component through noise removal resulting in a flat image devoid of three-dimensional depth, is addressed.

By executing this processing as part of the luminance plane noise removal, noise can be removed while retaining full three-dimensional depth as well as sharp definition at edge structures, whereas by executing the processing as part of the chrominance plane noise removal, achromatization and fading of color in the background where the color changes gently are prevented, color mottling noise can be removed while retaining the full color of the initial image and any color bleeding that would otherwise occur in the chromatic structure is prevented. In addition, the edge component is excluded with the utmost discretion without excessive removal of the noise component from the noise excluded over an area where the authenticity of a detected edge, i.e., an edge is bound to be present in the image structure having undergone the virtual noise removal, is assured.

5 Actual Noise Synthesis

After the entire noise component in each subband has been extracted, the noise component signals having been refined to achieve a high level of purity are synthesized by applying optimal weights, each corresponding to a specific frequency band, so as to assure the highest possible noise removal effect while minimizing damage to the actual image (processing (1-7) (2-7) (3-7) (4-7)). When the noise is hypothetically assumed to be white noise, weights are applied invariably at the ratio of 1:1 between the individual resolution hierarchical layers and mainly the high-frequency subbands HH, HL and LH are weighted relative to the low-frequency subband LL.

The optimal weights to be applied in this process vary depending upon the nature of the original image. In conjunction with the luminance image plane, which contains a great deal of high-frequency information, great weight should be applied to the high-frequency subbands, whereas a somewhat significant weight should be applied to the low-frequency subband in conjunction with a chrominance image plane containing a great deal of low-frequency information. Namely, the weight application is equivalent to adjusting the frequency projection space used in the noise extraction processing to a frequency space where accurate noise removal and desirable image structure preservation can both be assured, in correspondence to the nature of the original image. It is to be noted that Nw5 (x, y)=0 for Nw5 (see FIG. 4B) at the 1/32 resolution level, since the noise component signals are synthesized with noise not extracted.

$$N_w(\vec{x}) = \sum_{\substack{i=LL,LH,HL,HH \\ j=1,2,\ldots,5}} Wavelet^{-1}\{k_{nij} \cdot n'_{ij}(\vec{x})\} \qquad \text{[Expression 15]}$$

6 Actual Noise Removal Processing

The noise is removed (processing (0-8)) by actually subtracting the synthesized noise component Nw0 from the initial image S0 (LL0). The processing is executed with a noise removal rate λ (processing (0-9)) so as to afford a higher degree of freedom in consideration of the ultimate appearance of the image resulting from the noise removal.

$$S(\vec{x}) = S(\vec{x}) - \lambda \cdot N_w(\vec{x}) \qquad \text{[Expression 16]}$$

λ=const.

It is desirable to select a value substantially equal to 1.0 for λ during the chrominance plane processing, whereas it is desirable to leave noise at a specific rate in correspondence to the specific preference regarding sharpness during the luminance plane processing.

The noise removal processing executed in step S3 in FIG. 3 is completed through the procedure described above. It is to be noted that the noise removal processing in step S3 is executed individually for the luminance component L^ and the chrominance components a^ and b^.

7 Reverse Color Space Conversion

Next, in step S4 in FIG. 3, the noise-free image in the image processing space is converted to an image in the output color space. Provided that the output color space is identical to the input color space, the noise-free image can be converted through reverse conversion executed by reversing the procedural order of "1 color space conversion". Since the image processing space is a device-independent space, the noise-free image can be converted to any standard color space. If the input color space and the output color are not identical, the conversion should be executed in compliance with the specifications of the output color space.

8 Image Output

In step S5, the image data, having been rendered noise-free as described above, are output A feature that differentiates the first embodiment from the second embodiment to be described next is as follows. Namely, immediately after the noise component and the edge component are extracted from a single-layer plane and duly observed, edge component-to-noise component feedback is executed accurately in a fresh state before they become changed within the single-layer plane. In other words, the maximum extent of correction is executed within the closed domain corresponding to each specific frequency band.

Second Embodiment

While the noise component is refined in correspondence to each subband plane immediately after the residual edge component in the subband plane is extracted in the first embodiment, a multi-layer edge observation method, instead of the single-layer edge observation method, may be adopted so as to take full advantage of the multiresolution representation. Such a multi-layer edge observation method is described in reference to the second embodiment.

Since the image processing apparatus achieved in the second embodiment assumes a structure identical to that shown in FIG. 1 in reference to which the first embodiment has been described, a repeated explanation is not provided. In addition, since the flow of the image processing executed by the personal computer 1 in the second embodiment is similar to that in the flowchart presented in FIG. 3, a repeated explanation is not provided. The following explanation focuses on the differences from the processing executed in the first embodiment.

Figure 5A:
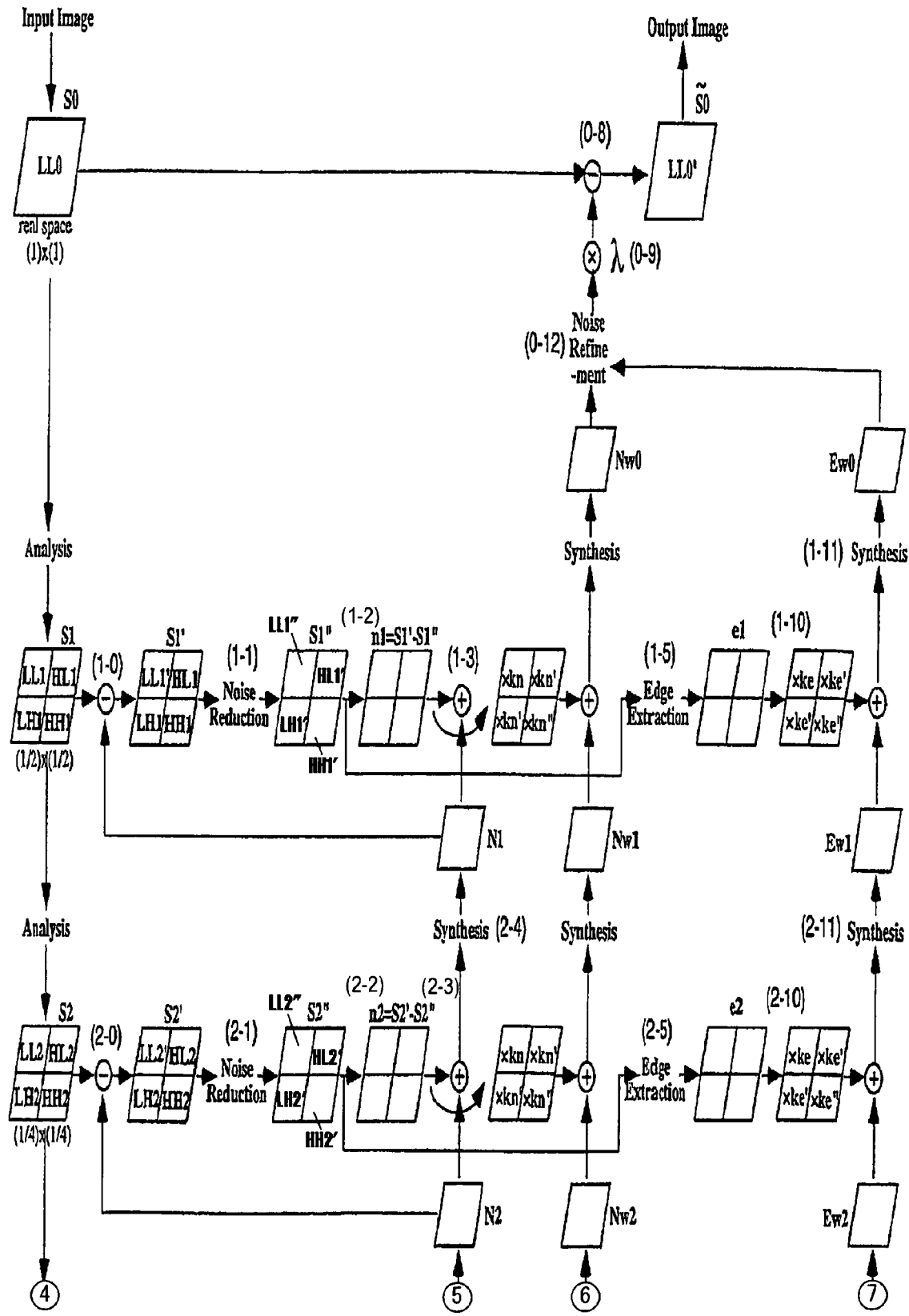
FIGS. 5A-5B presents a flowchart of the noise removal processing executed based upon multiple resolution levels in a second embodiment.
Figure 5B:
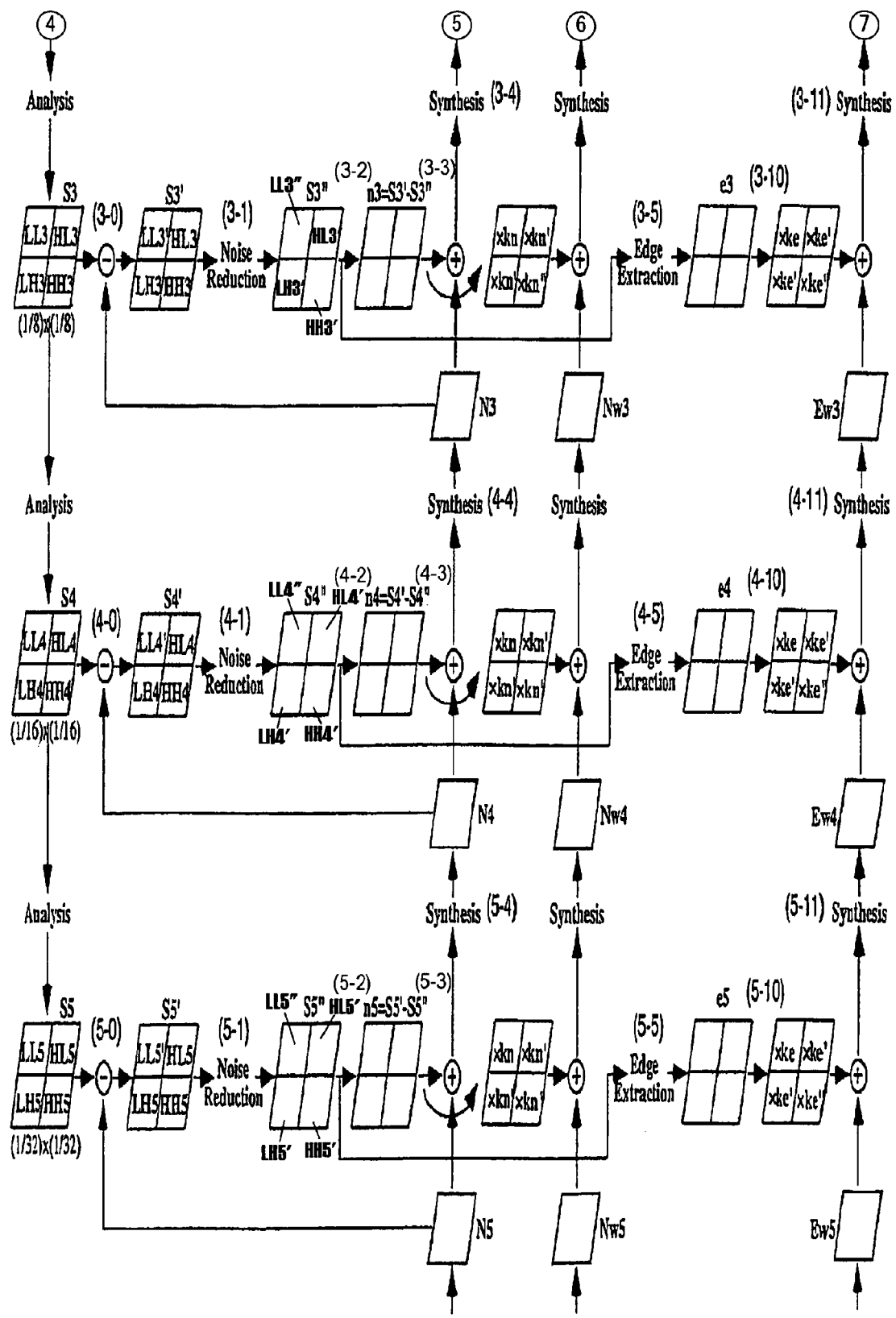

A third synthesis pass, i.e., edge synthesis, is incorporated with the virtual noise synthesis and the actual noise synthesis in the second embodiment, so as to refine the synthesized noise component by using the synthesized edge component. Thus, "4 Noise refining through residual edge observation" and "5 Actual noise synthesis" in the first embodiment are executed in reverse order in the second embodiment. FIGS. 5A-5B present a flowchart of the noise removal processing executed in the second embodiment based upon multiresolution representation.

Processing similar to that executed as described in "1 Color space conversion", "2 Multiresolution image representation" and "3 Noise extraction processing through virtual noise removal" in the first embodiment is executed.

4 Actual Noise Synthesis

Processing similar to that executed as described in "5 Actual noise synthesis" in the first embodiment is executed.

$$N_w(\vec{x}) = \sum_{\substack{i=LL,LH,HL,HH \\ j=1,2,\ldots,5}} Wavelet^{-1}\{k_{nij} \cdot n'_{ij}(\vec{x})\} \qquad \text{[Expression 17]}$$

5 Noise Refining Through Residual Edge Observation 5-1 Edge Extraction

Processing similar to that executed as described in "4-1 Edge extraction" in the first embodiment is executed.

5-2 Edge Synthesis

As has been described in "5 Actual noise synthesis" in reference to the first embodiment, the edge component signals are synthesized through inverse wavelet transformation (processing (1-11), (2-11), (3-11), (4-11), (5-11)). The edge synthesis executed in the embodiment is expressed as follows.

$$E_w(\vec{x}) = \sum_{\substack{i=LL,LH,HL,HH \\ j=1,2,\ldots,5}} Wavelet^{-1}\{k_{eij} \cdot e_{ij}(\vec{x})\} \qquad \text{[Expression 18]}$$

While the expression provided above is a standard expression similar to that used in the noise synthesis in that both the low-frequency subband LL and the high-frequency subbands HH, HL and LH are synthesized, it is confirmed through testing that more desirable results can be achieved by excluding the LL component from the integrating process when refining the noise based upon the edge component. Accordingly, the values (keLLj, keLHj, keHLj, keHHj) in the expression may assume values such as (0, 1, 1, 1) ((1-10), (2-10), (3-10), (4-10), (5-10)). In addition, the settings for the LH component and the HL component, each containing some low-frequency component, may also be lowered. It is to be noted that the LL component should also be excluded from the edge component extraction processing.

5-3 Noise Refining with Multi-Layer Edge

Noise refining is executed by using the synthesized edge component Ew0 and the synthesized noise component Nw0 based upon a concept similar to that described in "4-2 Noise refining with single-layer edge. Namely, based upon the hypothesis that when a residual edge component indicates a value greater than the expected noise value, the presence of an edge component with lower contrast over the corresponding image area in the original image is bound to be more pronounced, most of the synthesized noise component is estimated to be attributable to the low contrast edge component rather than the noise component. Then, the edge component is statistically excluded (processing (0-12)) by multiplying the synthesized noise component Nw0 by a Gaussian probability distribution attenuating factor in conjunction with the synthesized edge component Ew0, as expressed below.

$$N'_w(\vec{x}) = N_w(\vec{x}) \cdot \exp\left(-\frac{E_w(\vec{x})^2}{\sigma_{Eth}^2}\right)$$ [Expression 19]

A value 3~5 times the expected noise fluctuation value $\sigma_{th}$ in the actual space should be selected for $\sigma_{Eth}$, based upon a principle similar to that described in reference to the first embodiment. Namely, if a residual edge component assuming a signal level of $3\sigma$ or $5\sigma$ relative to the noise fluctuation width, which can be statistically determined not to be noise with 100% certainty, is detected, the likelihood of a low contrast edge being contained in the noise is high.

6 Actual Noise Removal Processing

The processing executed in this phase (processing (0-8), (0-9)) is similar to that described in "6 Actual noise removal processing" in reference to the first embodiment, except that the noise component having undergone the noise refining processing executed by using the synthesized edge component and the synthesized noise component as described above is used.

$$S(\vec{x}) = S(\vec{x}) - \lambda \cdot N'_w(\vec{x})$$ [Expression 20]

$\lambda$=const.

Processing similar to that executed as in the first embodiment "7 Reverse color space conversion" and "8 Image output".

Even an edge structure that cannot be detected through the edge single-layer component observation is likely to be detected at a resolution corresponding to the upper layer or the lower layer as an edge component is observed through multilayer observation in conjunction with multiresolution synthesis. In other words, the statistically proven nature of an image is such that an edge structure assumes a frequency usually distributed over a wider frequency range than a specific frequency range. This means that the edge structure can be expected to be detected at least at one resolution level in the multiresolution hierarchical layer system.

Accordingly, the embodiment aims to detect an edge component likely to be contained in the noise component through a broad-spectrum approach toward the image by observing the edge information corresponding to all the frequency bands in a batch. In addition, while thorough edge detection, particularly with regard to a low contrast edge, may not be assured in the embodiment in which the edge component is detected from the image having undergone virtual noise removal so as to minimize the influence of the noise, such incomplete edge detection may be successfully preempted based upon the statistically proven nature of the image. By adopting the processing in the embodiment, in conjunction with both the luminance plane and the chrominance planes, noise can be removed while retaining the textural richness of the original image with sharp definition and full three-dimensional depth, as well as excellent color fidelity is enabled, as in the first embodiment. It has also been confirmed through testing that a chromatic structure taking on a projected point pattern can be preserved successfully through the embodiment. Such a high level of pointed color structure preserving performance, too, is considered to be attributable to multilayer edge detection, which enables detection of an edge that would not be detected through single-layer observation.

Third Embodiment

In the third embodiment, the technologies achieved in the first embodiment and the second embodiment, i.e., "Noise refining through single-layer edge observation" and "Noise refining through multi-layer edge observation", are adopted in combination. Namely, double noise refining, whereby a fine edge component that may be contained in the noise component is statistically examined multiple times from different viewpoints, is executed basically by adopting the first embodiment and the second embodiment in combination.

Figure 6A:
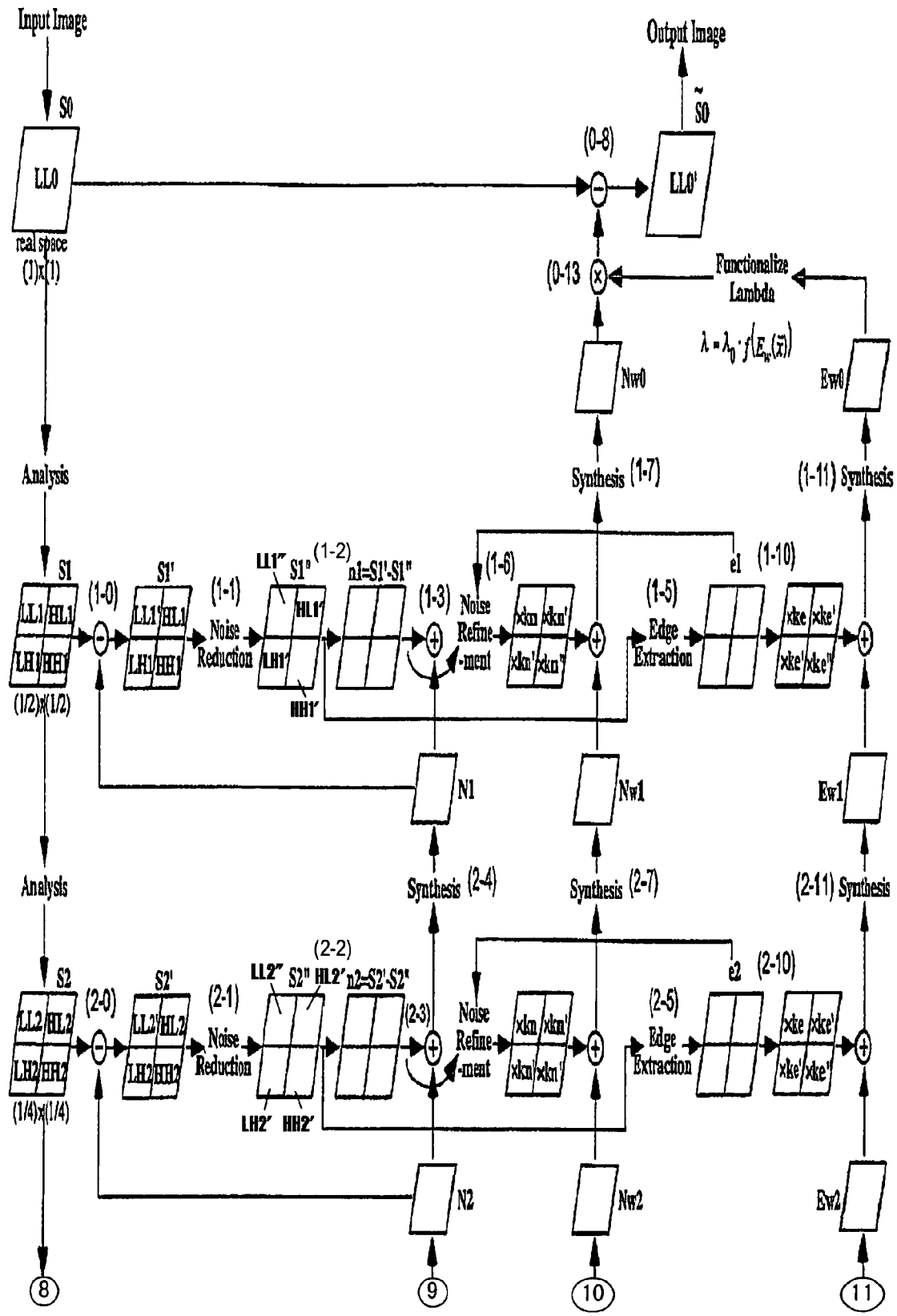
FIGS. 6A-6B presents a flowchart of the noise removal processing executed based upon multiple resolution levels in a third embodiment.
Figure 6B:
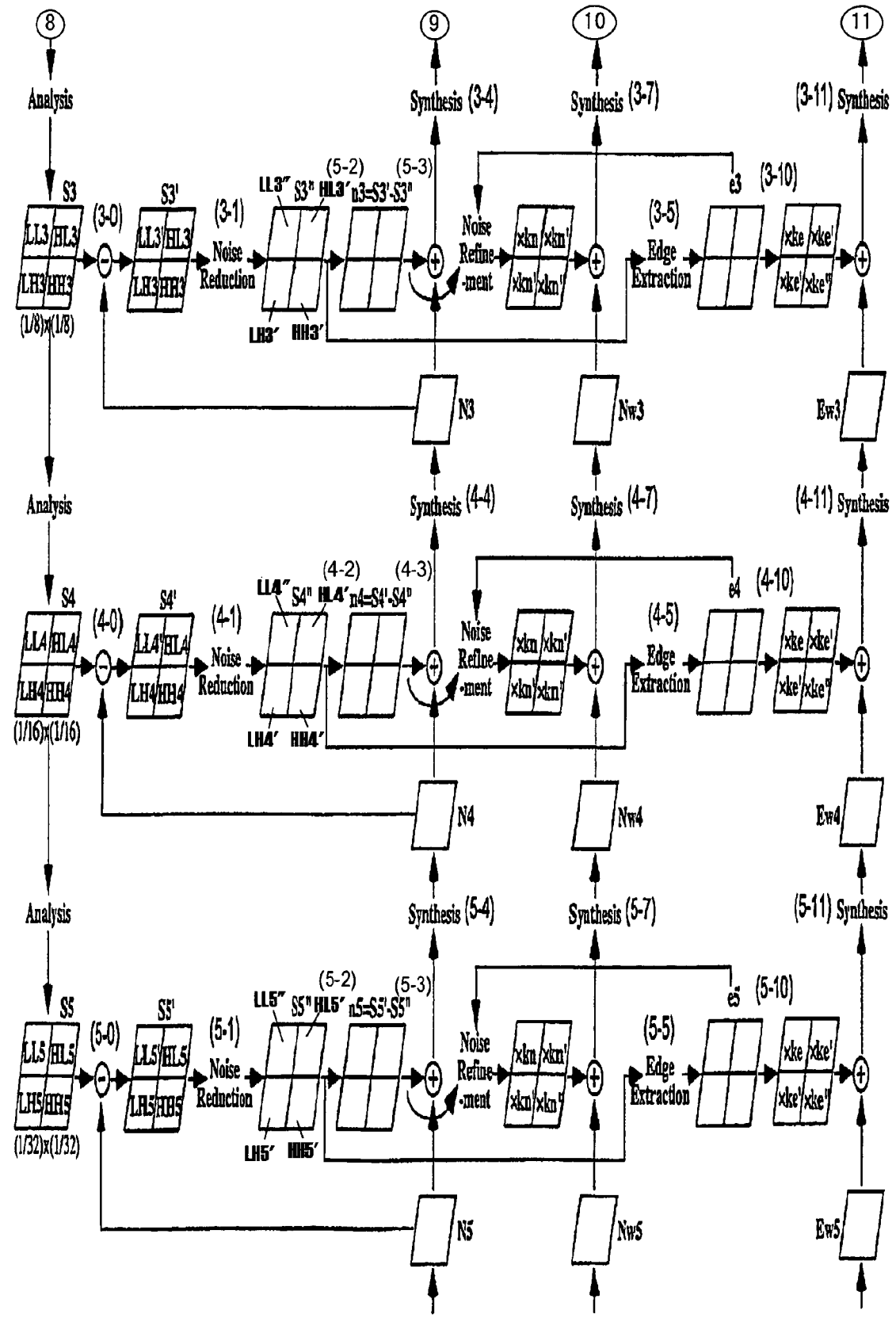

Since the image processing apparatus achieved in the third embodiment assumes a structure identical to that shown in FIG. 1 in reference to which the first embodiment has been described, a repeated explanation is not provided. In addition, since the flow of the image processing executed by the personal computer 1 in the third embodiment is similar to that in the flowchart presented in FIG. 3, a repeated explanation is not provided. The following explanation focuses on the differences from the processing executed in the first embodiment. FIGS. 6A-6B present a flowchart of the noise removal processing executed based upon the multiresolution representation in the third embodiment.

Processing similar to that executed in the first embodiment is executed in "1 Color space conversion", "2 Multiresolution image representation" and "3 Noise extraction processing through virtual noise removal" in the first embodiment is executed.

4 Noise Refining Through Single-Layer Edge Observation 4-1 Edge Extraction

An edge component $e_{ij}$ is extracted (processing (1-5), (2-5), (3-5), (4-5), (5-5)) as expressed below from each of the subband planes (LLj", HLj', LHj', HHj') having undergone the virtual noise removal as in the first embodiment.

$$e_{ij}(\vec{x}) = \nabla^2 V_{ij}'(\vec{x})$$ [Expression 21]

4-2 Noise Refining with Single-Layer Edge

As in the first embodiment, the noise component $n_{ij}$ having been extracted from each subband plane is then refined within the corresponding layer plane, i.e., within a single-layer plane come by using the residual edge component $e_{ij}$ having been extracted from the same subband plane. In more specific terms, the edge component is statistically excluded (processing (1-6), (2-6), (3-6), (4-6), (5-6)) by multiplying the noise component by a Gaussian probability distribution attenuating factor, as expressed below.

$$n'_{ij}(\vec{x}) = n_{ij}(\vec{x}) \cdot \exp\left(-\frac{e_{ij}(\vec{x})^2}{\sigma_{ethij}^2}\right)$$ [Expression 22]

As in the first embodiment, $\sigma_{ethij}$ should be set to $3\sigma_{thij}$ through $5\sigma_{thij}$.

5 Actual Noise Synthesis

As in the first embodiment, after the entire noise component in each subband has been seamlessly extracted, the noise component signals having been refined to achieve a highest possible level of purity are synthesized (processing (1-7) (2-7) (3-7) (4-7) (5-7)).

$$N_w(\vec{x}) = \sum_{\substack{i=LL,LH,HL,HH \\ j=1,2,\ldots,5}} Wavelet^{-1}\{k_{nij} \cdot n'_{ij}(\vec{x})\}$$ [Expression 23]

6 Edge Synthesis

As in the second embodiment, the edge component signals are synthesized as expressed below (processing (1-11), (2-11), (3-11), (4-11), (5-11).

$$E_w(\vec{x}) = \sum_{\substack{i=LL,LH,HL,HH \\ j=1,2,\ldots,5}} Wavelet^{-1}\{k_{eij} \cdot e_{ij}(\vec{x})\}$$ [Expression 24]

7 "Actual Noise Removal" Incorporated with "Noise Refining Through Multilayer Edge Observation"

The noise refining processing executed in the second embodiment is executed, this time from a different viewpoint by building the processing in a function for the noise removal rate λ as described below.

7-1 Modifying the Noise Removal Rate λ as a Function $$\lambda(\vec{x}) = \lambda_0 \cdot \frac{\exp\left(-\frac{E_w(\vec{x})^2}{\sigma_{Eth}^2}\right)}{\exp\left(-\frac{\alpha^2}{\sigma_{Eth}^2}\right)}$$ [Expression 25]

λ0 = const.

α = const.

As in the second embodiment, $\sigma_{Ethij}$ should be set to $3\sigma_{nth}$ through $5\sigma_{nth}$. In addition, the denominator does not normally need to be standardized and accordingly, α may be set to 0. In other words, noise refining processing completely identical to that executed in the second embodiment is simply executed within the function for the noise removal rate λ.

7-2 Clipping the Noise Removal Rate λ

$$\lambda(\vec{x}) = MIN(\lambda(\vec{x}),1.0)$$ [Expression 26]

7-3 Execution of Noise Removal

The noise is removed as expressed below from the original image S0 (processing (0-8)) by multiplying (processing (0-13)) the synthesized noise Nw0 by the noise removal rate λ having been modified as a function as described above.

$$\tilde{S}(\vec{x}) = S(\vec{x}) - \lambda(\vec{x}) \cdot N_w(\vec{x})$$ [Expression 27]

The advantages of both the first embodiment and the second embodiment can be obtained by adopting the third embodiment described above. Namely, statistical verification is executed multiple times by using the edge component from different viewpoints so as to improve the purity of the noise component.

"8 Reverse color space conversion" and "9 Image output" are executed as has been described in "7 Reverse color space conversion" and "8 Image output" in reference to the first embodiment.

It is to be noted that while examples of sequential synthesis processing, whereby the noise component is extracted in sequence as described in "2 Multiresolution image representation" and "3 Noise extraction processing through virtual noise removal" is executed by first converting the image to images at multiple resolution levels, sequentially smoothing the images with the noise removal filters and integrating the extracted noise component signals and then executing synthesized noise subtraction processing before smoothing the upper hierarchical layer image, have been explained in reference to the first through third embodiment, the noise component may instead be extracted through sequential analysis processing achieved by reversing the procedural order of the sequential synthesis processing.

Namely, the noise component may be extracted by first executing multiresolution transformation at the first stage and then smoothing the image plane with the corresponding noise removal filter. In this reversed sequential processing, the extracted noise component will be subtracted from the LL image plane before proceeding to the multiresolution transformation at the next stage. It is to be noted that a flowchart of the reversed sequential processing, which can be easily obtained by modifying any of the flowcharts presented in FIGS. 4~6, is not provided.

Fourth Embodiment

Today, noise removal processing is often executed by applying a very large noise removal filter directly on the actual spatial plane, instead of removing noise by adopting a multiresolution technology as has been described in reference to the first through third embodiments. The following is a description of an example of a large filter application given in reference to the fourth embodiment.

Figure 7:
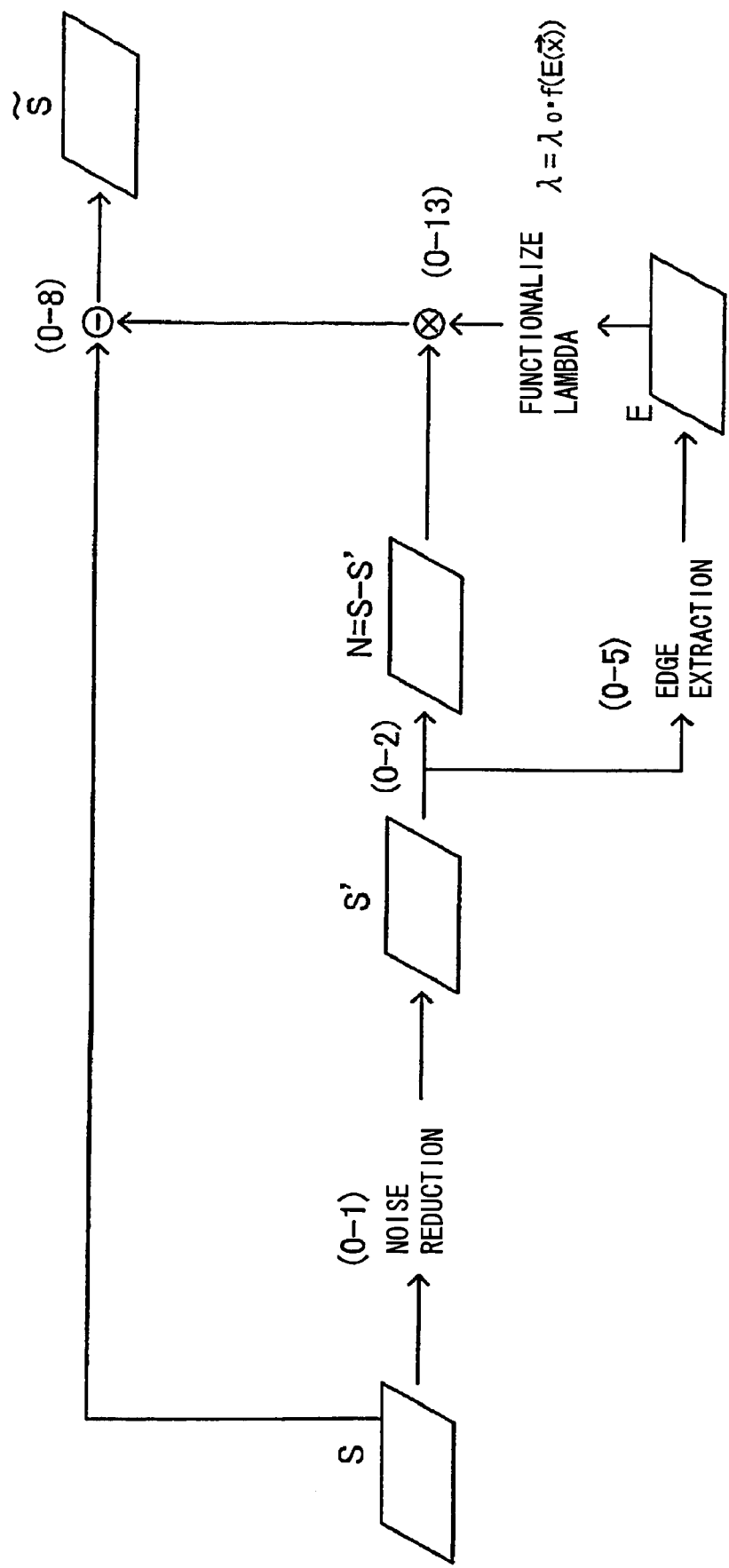
FIG. 7 presents a flowchart of the noise removal processing executed in a fourth embodiment.

Since the image processing apparatus achieved in the fourth embodiment assumes a structure identical to that shown in FIG. 1 in reference to which the first embodiment has been described, a repeated explanation is not provided. In addition, since the flow of the image processing executed by the personal computer 1 in the fourth embodiment is similar to that in the flowchart presented in FIG. 3, a repeated explanation is not provided. The following explanation focuses on the differences from the processing executed in the first embodiment. FIG. 7 presents a flowchart of the noise removal processing executed in the fourth embodiment.

1 Color Space Conversion

Processing similar to that in the first embodiment is executed.

2 Noise Extraction Processing Through Virtual Noise Removal

Since the actual spatial plane is represented by S(x, y), processing identical to that executed on the subband plane V(x, y) in the first embodiment should be executed simply by substituting S for V. However, a greater integrating range must be assumed.

2-1 Noise Removal Processing

While the noise removal processing may be executed through any processing method in order to create the smoothed plane S' by using a σ filter, a ϵ filter or the like as the noise removal filter, the noise removal processing in the embodiment is executed by using the modified bilateral filter expressed below, as in the first embodiment (processing (0-1)).

$$S'(\vec{x}) = \frac{\int_{|\vec{x}'-\vec{x}|\leq 2r_{th}} S(\vec{x}')\exp\left(-\frac{|S(\vec{x}')-S(\vec{x})|^2}{\sigma_{th}^2} \cdot \frac{|\vec{x}'-\vec{x}|^2}{r_{th}^2}\right)d\vec{x}'}{\int_{|\vec{x}'-\vec{x}|\leq 2r_{th}} \exp\left(-\frac{|S(\vec{x}')-S(\vec{x})|^2}{\sigma_{th}^2} \cdot \frac{|\vec{x}'-\vec{x}|^2}{r_{th}^2}\right)d\vec{x}'}$$ [Expression 28]

While it is desirable to assume a value of, for instance, 50 for rth and select a pixel range of approximately 101×101 in order to achieve a truly clean noise removal effect, the following explanation is provided by assuming, for purposes of simplification, that rth=12 and that the integrand is executed over a pixel range of 25×25. However, if the processing is executed by using a σ filter or a ε filter that is not affected by any spatial factor, there is no parameter equivalent to rth and thus, only the integrating range needs to be set.

2-2 Noise Extraction Processing

The noise extraction processing is executed as expressed below (processing (0-2)).

$$N(\vec{x})=S(\vec{x})-S'(\vec{x})$$ [Expression 29]

3 Edge Extraction

The edge component is extracted (processing (0-5)) as expressed below from the actual spatial plane S' having undergone the virtual noise removal.

$$E(\vec{x})=\nabla^2 S'(\vec{x})$$ [Expression 30]

A Laplacian filter is used as the edge detection filter in this process. While a Laplacian filter assuming a 9×9 pixel range, identical to that in the first embodiment, may be used, it is more desirable to set the filtering range to approximately 25×25 since the filtering range of the smoothing filter is set to 25×25. A 25×25 Laplacian filter can be created simply by determining the difference between a smoothed image resulting from three applications of a 9×9 Gaussian filter and the original image. Namely, the 25×25 Laplacian filter may be expressed as below.

$$\nabla^2 = 1 - (\text{Gaussian})_{25\times 25}$$ [Expression 31]
$$= 1 - (\text{Gaussian})_{9\times 9} \otimes (\text{Gaussian})_{9\times 9} \otimes (\text{Gaussian})_{9\times 9}$$

4 "Actual Noise Removal" Incorporated with "Noise Refining Through Residual Edge Observation"

4-1 Modifying the Noise Removal Rate λ into a Function

As in the third embodiment, the noise refining processing is incorporated into the noise removal rate λ as expressed below. However, noise refining processing identical to that in the first embodiment may be executed without modifying the noise removal rate λ into a function.

$$\lambda(\vec{x}) = \lambda_0 \cdot \frac{\exp\left(-\frac{E(\vec{x})^2}{\sigma_{Eth}^2}\right)}{\exp\left(-\frac{\alpha^2}{\sigma_{Eth}^2}\right)}$$ [Expression 32]

$\lambda 0 = const.$ $\alpha = const.$

The optimal range for the value of $\sigma_{Ethij}$ is $3\sigma_{th}$ to $5\sigma_{th}$. In addition, α should normally be set to 0 and no standardization is required.

4-2 Clipping the Noise Removal Rate λ

$$\lambda(\vec{x})=\text{MIN}(\lambda(\vec{x}),1.0)$$ [Expression 33]

4-3 Execution of Noise Removal

The noise is removed as expressed below from the original image S0 (processing (0-8)) by multiplying (processing (0-13)) the extracted noise N by the noise removal rate λ having been modified as a function.

$$\tilde{S}(\vec{x})=S(\vec{x})-\lambda(\vec{x})\cdot N(\vec{x})$$ [Expression 34]

The processing described above is individually executed on the luminance plane and the chrominance planes.

"5 Reverse color space conversion" and "6 Image output" are executed as has been described in "7 Reverse color space conversion" and "8 Image output" in reference to the first embodiment.

As described above, a low contrast edge component that cannot be distinguished through a noise removal filter can be excluded from the noise component without using the multi-resolution representation technologies. Thus, the embodiment effectively addresses the challenge of the related art, i.e., an edge component being removed through noise removal to result in a flat image devoid of three-dimensional depth.

By executing this processing as part of the luminance plane noise removal, noise can be removed while retaining full three-dimensional depth as well as sharp definition at edge structures, whereas by executing the processing as part of the chrominance plane noise removal, achromatization and fading of color in the background where the color changes gently are prevented, color mottling noise can be removed while retaining the full color of the initial image and any color bleeding that would otherwise occur in the chromatic structure is prevented. In addition, the edge component can be excluded with the utmost discretion without excessive removal of the noise component from the noise excluded over an area where the authenticity of a detected edge, i.e., an edge is bound to be present in the image structure having undergone the virtual noise removal, is assured.

The first through fourth embodiment described above each provide a noise removal technology assuring a high level of textural richness achieved through accurate separation of the edge component and the noise component from each other by minimizing the adverse effect of the edge component present in the noise component and vice versa, which would occur at any noise removal filter.

While the image area in the original image corresponding to an edge area remaining after the virtual noise removal, is likely to contain a fine edge structure with a signal level equal to or less than the noise fluctuation width, such a fine edge, which cannot be accurately distinguished from the noise component through a noise removal filter, can be statistically differentiated from the noise component through any of the first through fourth embodiments, so as to enable noise removal assuring a high level of textural reproducibility. In addition, edge detection is executed following the virtual noise removal in order to detect an edge to be used as an index based upon which the fine edge is distinguished from the noise component. Thus, the likelihood of noise mixed in with the edge component is extremely low and the reliability of the index is very high, assuring accurate separation of the fine edge component contained in the noise component.

By executing the processing on the luminance component, noise can be removed while retaining textural details, the sharpness of edges and the three-dimensional depth, whereas by executing the processing on the chrominance components, noise can be removed while assuring a high level of color fidelity with respect to saturation over a solid color area or over a color structure area and minimizing the extent of color bleeding over color boundaries.

Furthermore, by executing the edge detection after the noise removal filtering processing, the overall processing can be further simplified with the noise removal filtering processing, the processing load of which is the heaviest in the entire noise removal processing procedure, required to be executed just once.

Moreover, an edge index, determined by detecting and integrating the edge component signals detected and synthesized through multilayer observation based upon the multiresolution representation, is used in addition to the single-layer based edge index, to separate the edge component present in the noise component by retracing the edge component mix model. As a result, any chance of edge detection failure due to certain frequency characteristics in a given edge structure is eliminated and it is guaranteed that the edge structure will be detected at one layer or another.

Consequently, the likelihood of very fine edge structures with delicate textural details with a signal level low enough to be buried in the noise component and thus lost in the noise removal in the related art being present can be determined through a broad-spectrum approach toward the overall image structure, and an impulse-type edge structure can be salvaged by detecting it based upon its Fourier characteristics indicating spectral expansion into all frequency bands. Thus, textural details of a dense growth of leaves, for example, can be removed from the noise component by detecting the likelihood of the presence of the textural details based upon the image structure of a tree trunk, a branch or spots representing light sources in a night scene or a dot pattern within a flower, detected as an edge component, is removed from the noise component so as to preempt the problem of erroneous elimination of the edge component inherent to the noise removal in the related art and to enable advanced noise removal assuring faithful reproduction of the textural richness of the original image.

In addition, whenever there is any likelihood of an adverse effect from the noise removal adopted in conjunction with the multiresolution technologies, affecting the entire frequency band, the advantage of the edge detection assuming the broad-spectrum approach whereby detection is executed over the entire frequency band at once becomes even more pronounced.

(Variations)

It is to be noted that while the noise removal filter used in each of the first through fourth embodiment is an edge-preserving smoothing filter, the present invention may be adopted in conjunction with a noise removal filter used in nonlinear conversion in the related art or in conjunction with a modified noise removal filter disclosed in International Publication No. 2006/WO/2006/106919 pamphlet (proposed by the inventor of the present invention)

In more specific terms, the virtual noise-free plane V' or S' in the first through fourth embodiments may be generated through an alternative method as expressed below. In such applications, too, an edge component with a signal level low enough to be buried in the fluctuating noise is bound to be mixed into the noise component and thus, the edge-based noise refining described in reference to the embodiments will prove effective.

In addition, while the edge-preserving smoothing filter described in the Best Mode provides a noise removal effect with a maximum level of textural richness fidelity which could not be achieved in the related art, the present invention will maximize the performance level of an inferior noise removal filter as well. This means that the use of a simpler noise removal filter may be given priority by taking into consideration how the noise removal filter performance may be maximized through the present invention when selecting the optimal noise removal filter.

The noise removal processing may be executed on the luminance plane as expressed below.

[Expression 35]
$$V'(\vec{x}) = V(\vec{x}) - \nabla^2 V(\vec{x}) \cdot \exp\left(-\frac{|\nabla^2 V(\vec{x})|^2}{\sigma_{th}^2}\right)$$

$$V''(\vec{x}) = V'(\vec{x}) + \nabla^2 V'(\vec{x}) \cdot \exp\left(-\frac{|\nabla^2 V'(\vec{x})|^2}{\sigma_{th}^2}\right)$$

$$V'''(\vec{x}) = V''(\vec{x}) - \nabla^2 V''(\vec{x}) \cdot \exp\left(-\frac{|\nabla^2 V''(\vec{x})|^2}{\sigma_{th}^2}\right)$$

$$V^{(4)}(\vec{x}) = V'''(\vec{x}) + \nabla^2 V'''(\vec{x}) \cdot \exp\left(-\frac{|\nabla^2 V'''(\vec{x})|^2}{\sigma_{th}^2}\right)$$

The noise removal processing may be executed on the chrominance planes as expressed below.

[Expression 36]
$$V'(\vec{x}) = V(\vec{x}) - \nabla^2 V(\vec{x}) \cdot \exp\left(-\frac{|\nabla^2 V(\vec{x})|^2}{\sigma_{th}^2}\right)$$

$$V''(\vec{x}) = V'(\vec{x}) - \nabla^2 V'(\vec{x}) \cdot \exp\left(-\frac{|\nabla^2 V'(\vec{x})|^2}{\sigma_{th}^2}\right)$$

It is to be noted that the Laplacian filter used in conjunction with the multiresolution representation as defined in the expressions above may be the simplest 3×3 Laplacian filter shown in FIG. 8 and that it may be expanded as expressed below if it is to be used in the actual space alone, as in the fourth embodiment.

[Expression 37]
$$V^2 = 1 - (\text{Gaussian})_{9 \times 9}$$
$$= 1 - {}^t(1\ 8\ 28\ 56\ 70\ 56\ 28\ 8\ 1)/256 \otimes$$
$$(1\ 8\ 28\ 56\ 70\ 56\ 28\ 8\ 1)/256$$

At the edge-preserving smoothing filter (spatial filter) described in reference to the first through fourth embodiments and the noise removal filter (signal attenuation filter) described in reference to the variations, a noise fluctuation index value determined uniquely for the original image is set and noise is removed through adaptive smoothing by comparing the signal fluctuation width detected in the original image structure with the noise fluctuation index value.

At the edge-preserving smoothing filter used in each of the embodiments, the signal values at the pixels near the target pixel, fluctuating slightly within a very small range equal to or less than that indicated by the noise fluctuation index value, are selectively averaged through weighted averaging in conformance to the signal differential value, so as to generate an adaptively smoothed image having undergone the temporary noise removal. At the filter described in reference to the variations, the noise component is extracted through a signal conversion processing phase in which only the component that fluctuates very slightly over a range equal to or less than the noise fluctuation index value in the differential signal, representing the difference between the original image and the uniformly smooth image, the component that fluctuates is allowed to pass through, and the noise component is then subtracted from the original image to generate a virtual noise-free image.

It is to be noted that the image processing space described in reference to the first fourth embodiments simply represents an example of an optimal color space, and the advantages of the present invention may be achieved in noise removal executed in a color space in the related art without losing any of its efficacy. For instance, the present invention may be adopted in processing executed in the latest uniform color space, the CIECAM02.

In addition, while the multiresolution representation technologies described above are superior technologies whereby multiresolution representation is achieved by using both the low-frequency subbands and the high-frequency subbands, similar advantages may be achieved with regard to the residual edge-based noise refining function, even if only either the low-frequency subbands or the high-frequency subbands are used, as in the related art.

In the second embodiment described earlier, the edge component signals are synthesized as well as the noise component signals through the multiresolution representation technologies. In the fourth embodiment, on the other hand, noise is removed through noise refining without adopting a multiresolution representation technology. As a variation of these embodiments, the edge component signals alone may be synthesized through the multiresolution representation technologies and noise removal may be executed for the original image in the actual space based upon the synthesized edge component.

This variation is now described in reference to FIGS. 5A-5B and 7. While FIGS. 5A-5B show edge extraction (processing (1-5), etc.) executed on the image S" having undergone the noise removal at each resolution level, edge extraction should be executed in the variation for each subband plane of the image S immediately after having undergone the wavelet transformation. Then, a inverse wavelet transformation such as that shown in FIGS. 5A-5B should be executed for the extracted edge component so as to synthesize the edge component signals.

Subsequently, processing similar to that in the fourth embodiment should be executed, as shown in FIG. 7, by using the synthesized edge component. The processing in the variation should be executed by replacing the edge extraction processing executed in the actual space shown in FIG. 7 with the edge synthesis processing in FIGS. 5A-5B having been described above.

As described above, the edge component synthesized through the multiresolution representation technologies can be utilized in the noise removal as well as in edge emphasis, as in the related art. In short, edge component signals with frequency components thereof spanning the entire frequency range having been extracted in an optimal manner through the microscopic approach and the broad-spectrum approach, are used to refine the noise through multilayer observation. As a result, noise can be removed while ensuring that the noise component no longer contains any weak edge component representing a delicate edge structure present over multiple layers. Furthermore, the processing load of the noise refining, achieved through simple nonlinear conversion processing, is minimized.

Figure 9:
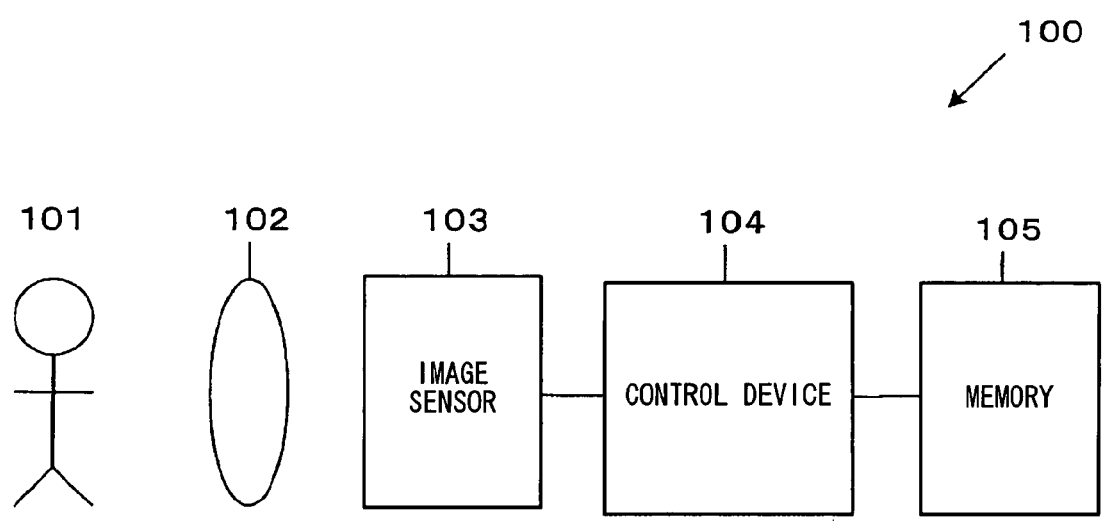
FIG. 9 shows the structure of the digital camera 100.

An explanation has been given above in reference to the embodiments and variations on an example in which the image processing apparatus is constituted with a personal computer 1. However, the noise removal processing executed in the personal computer 1 in the description provided above may instead be executed in a digital camera (electronic camera). FIG. 9 shows the structure of such a digital camera 100. The digital camera 100 includes a photographic lens 102, an image sensor 103 constituted with a CCD or the like, a control device 104 constituted with a CPU and peripheral circuits, a memory 105 and the like.

The image sensor 103 photographs (captures an image of) a subject 101 via the photographic lens 102 and outputs image data obtained through the photographing operation to the control device 104. This processing is equivalent to the image data input executed in step S1 in FIG. 3 in reference to which the first embodiment has been described. The control device 104 executes the noise removal processing in any of the embodiments or their variations having been described earlier on the image data obtained through the photographing operation executed at the image sensor 103 and stores the image data resulting from the optimal noise removal into the memory 105 as needed. The control device 104 executes the noise removal processing described earlier based upon a specific program stored in a ROM (not shown) or the like.

As described above, noise removal assuring a high level of reproducible image quality is enabled in the digital camera 100 and the image data resulting from the optimal noise removal can then be stored into the memory 105 and recorded into a recording medium such as a detachable memory card.

While the invention has been particularly shown and described with respect to the embodiments and variations thereof by referring to the attached drawings, the present invention is not limited to these examples and it will be understood by those skilled in the art that various changes in form and detail may be made therein without departing from the spirit, scope and teaching of the invention.

What is claimed is:

1. An image processing method for removing a noise component contained in an original image, comprising:
    separating an original image into a temporary noise-free image and a temporary noise component;
    extracting an edge component in the temporary noise-free image by executing edge detection on the temporary noise-free image;
    determining a fine edge component in the original image contained in the temporary noise component based upon a level of the extracted edge component;
    extracting an actual noise component by excluding the fine edge component from the temporary noise component; and
    removing noise from the original image based upon the extracted actual noise component;
    wherein a probability of the fine edge component being present in the temporary noise component is estimated to be higher when the level of the edge component is greater relative to a noise fluctuation index value determined uniquely in correspondence to the original image.

2. An image processing method according to claim 1, wherein:
    a mixing ratio with which the fine edge component is present is statistically estimated based upon a Gaussian distribution probability assuming a ratio of the edge component and the noise fluctuation index value as an argument.

3. An image processing method according to claim 2, wherein:
the fine edge component is excluded through attenuation by multiplying the temporary noise component by the Gaussian distribution probability.

4. An image processing method for removing a noise component contained in an original image, comprising:
separating an original image into a temporary noise-free image and a temporary noise component;
extracting an edge component in the temporary noise-free image by executing edge detection on the temporary noise-free image;
determining a fine edge component in the original image contained in the temporary noise component based upon a level of the extracted edge component;
extracting an actual noise component by excluding the fine edge component from the temporary noise component; and
removing noise from the original image based upon the extracted actual noise component;
wherein the original image is separated into the temporary noise-free image having undergone adaptive smoothing and the temporary noise component representing a residue thereof by setting a noise fluctuation index value determined uniquely in correspondence to the original image and comparing a signal fluctuation width detected in an original image structure with the noise fluctuation index value.

5. An image processing method according to claim 4, wherein:
the temporary noise-free image having undergone adaptive smoothing is generated through weighted averaging of signal values at pixels near a target pixel, which fluctuate over a narrow range equal to or less than a range indicated by the noise fluctuation value, the weighted averaging being selectively executed according to a signal differential value; and
the temporary noise component is obtained by determining a difference between the temporary noise-free image and the original image.

6. An image processing method according to claim 4, wherein:
the temporary noise component is extracted through a signal conversion processing phase in which only a component fluctuating over a small range equal to or less than a range indicated by the noise fluctuation index value in a differential signal representing a difference between the original image and a uniformly smooth image, is allowed to pass through; and
the temporary noise-free image is generated by subtracting the temporary noise component from the original image.

7. An image processing method for removing a noise component contained in an original image, comprising:
separating an original image into a temporary noise-free image and a temporary noise component;
extracting an edge component in the temporary noise-free image by executing edge detection on the temporary noise-free image;
determining a fine edge component in the original image contained in the temporary noise component based upon a level of the extracted edge component;
extracting an actual noise component by excluding the fine edge component from the temporary noise component; and
removing noise from the original image based upon the extracted actual noise component;
wherein an image referencing range over which the edge detection is executed is set in correspondence to an image referencing range set for generation of the temporary noise-free image.

8. An image processing method for removing a noise component contained in an original image, comprising:
separating an original image into a temporary noise-free image and a temporary noise component;
extracting an edge component in the temporary noise-free image by executing edge detection on the temporary noise-free image;
determining a fine edge component in the original image contained in the temporary noise component based upon a level of the extracted edge component;
extracting an actual noise component by excluding the fine edge component from the temporary noise component; and
removing noise from the original image based upon the extracted actual noise component;
wherein the original image is a band-limited subband image in multiresolution representation.

9. An image processing method for removing a noise component contained in an original image, comprising:
separating an original image into a temporary noise-free image and a temporary noise component;
extracting an edge component in the temporary noise-free image by executing edge detection on the temporary noise-free image;
determining a fine edge component in the original image contained in the temporary noise component based upon a level of the extracted edge component;
extracting an actual noise component by excluding the fine edge component from the temporary noise component; and
removing noise from the original image based upon the extracted actual noise component;
wherein the original image is an original image expressed in an actual space.

10. An image processing method for removing a noise component contained in an original image, comprising:
separating an original image into a temporary noise-free image and a temporary noise component;
extracting an edge component in the temporary noise-free image by executing edge detection on the temporary noise-free image;
determining a fine edge component in the original image contained in the temporary noise component based upon a level of the extracted edge component;
extracting an actual noise component by excluding the fine edge component from the temporary noise component; and
removing noise from the original image based upon the extracted actual noise component;
wherein processing on the original image is executed individually on a luminance plane and a chrominance plane.

11. An image processing method according to claim 1, wherein:
a uniform index value is used as the noise fluctuation index value irrespective of a brightness level of the original image by converting the original image to an image in uniform noise space or an image in a uniform color•uniform noise space.

* * * * *